United States Patent [19]
Matsuoka et al.

[11] Patent Number: 5,105,208
[45] Date of Patent: Apr. 14, 1992

[54] IMAGE FORMING APPARATUS WITH GOOD RESPONSE MOTOR SERVO CONTROL

[75] Inventors: Takashi Matsuoka; Osamu Kenmochi, both of Yokohama, Japan

[73] Assignee: Kabushiki Kaisha Toshiba, Kawasaki, Japan

[21] Appl. No.: 659,520

[22] Filed: Feb. 22, 1991

[30] Foreign Application Priority Data
Feb. 23, 1990 [JP] Japan .................... 2-42869

[51] Int. Cl.⁵ .................. G01D 15/11; G03G 15/00
[52] U.S. Cl. .................... 346/160; 355/200
[58] Field of Search .............. 355/200, 210; 346/153.1, 160; 358/300

[56] References Cited
U.S. PATENT DOCUMENTS

| | | |
|---|---|---|
| 3,790,271 | 2/1974 | Donohue et al. . |
| 3,820,893 | 6/1974 | Donohue et al. . |
| 3,917,400 | 11/1975 | Rodek et al. . |
| 4,072,415 | 2/1978 | Inoue et al. . |
| 4,165,170 | 8/1979 | Donohue et al. . |
| 4,270,860 | 6/1981 | Tsuda et al. . |
| 4,769,669 | 9/1988 | Watanabe . |
| 4,949,104 | 8/1990 | Negoro et al. ............... 355/316 X |

FOREIGN PATENT DOCUMENTS

| | | |
|---|---|---|
| 216484 | 8/1986 | European Pat. Off. . |
| 259839 | 9/1987 | European Pat. Off. . |
| 343066 | 5/1989 | Japan . |

Primary Examiner—R. L. Moses
Attorney, Agent, or Firm—Foley & Lardner

[57] ABSTRACT

Controlling a motor having a high standard frequency in a manner to be given priority when servo-controlling a plurality of motors allows the delay time of motor control to be reduced and the servo control of the motors to be performed with a good response characteristic.

7 Claims, 20 Drawing Sheets

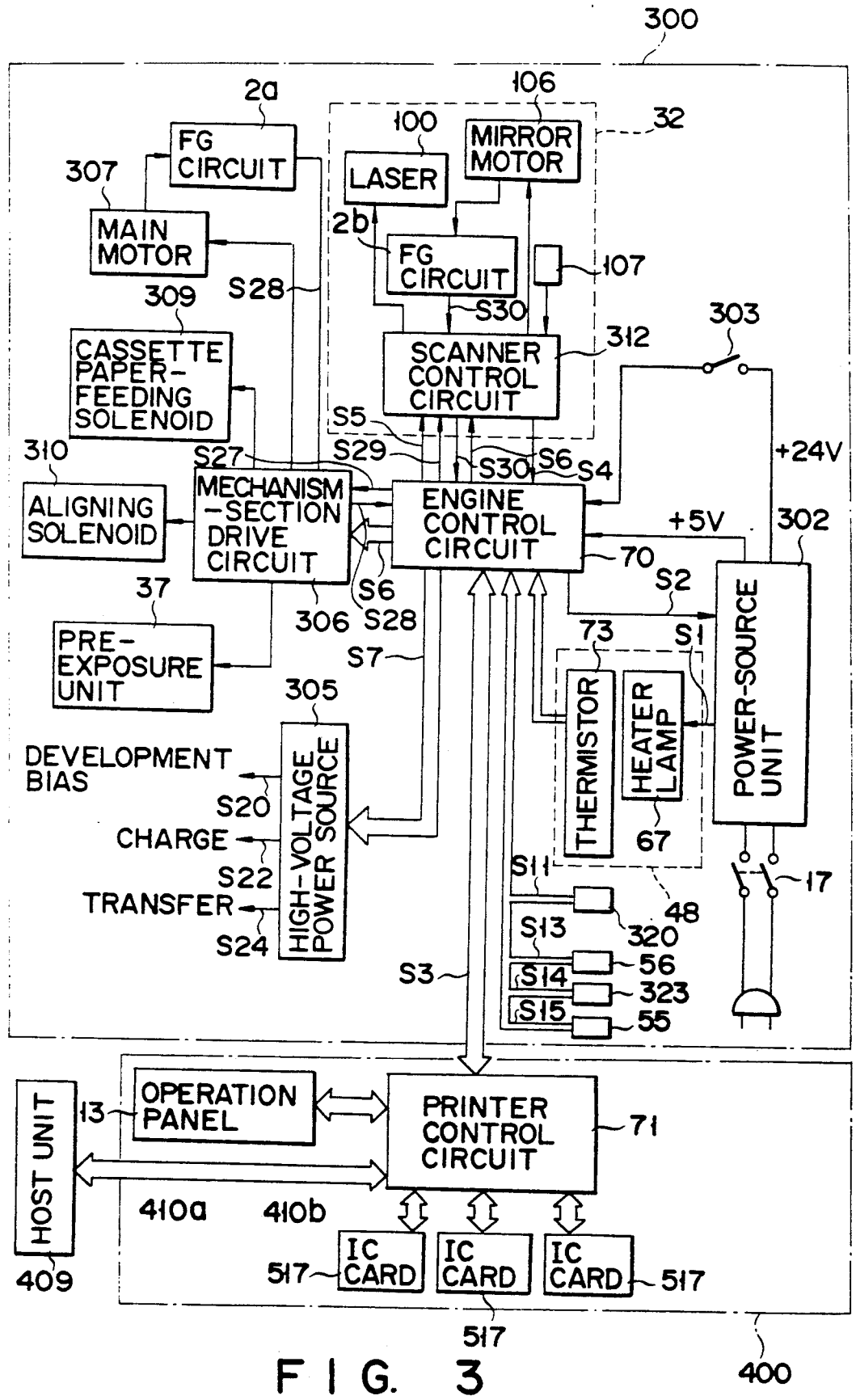
F I G. 3

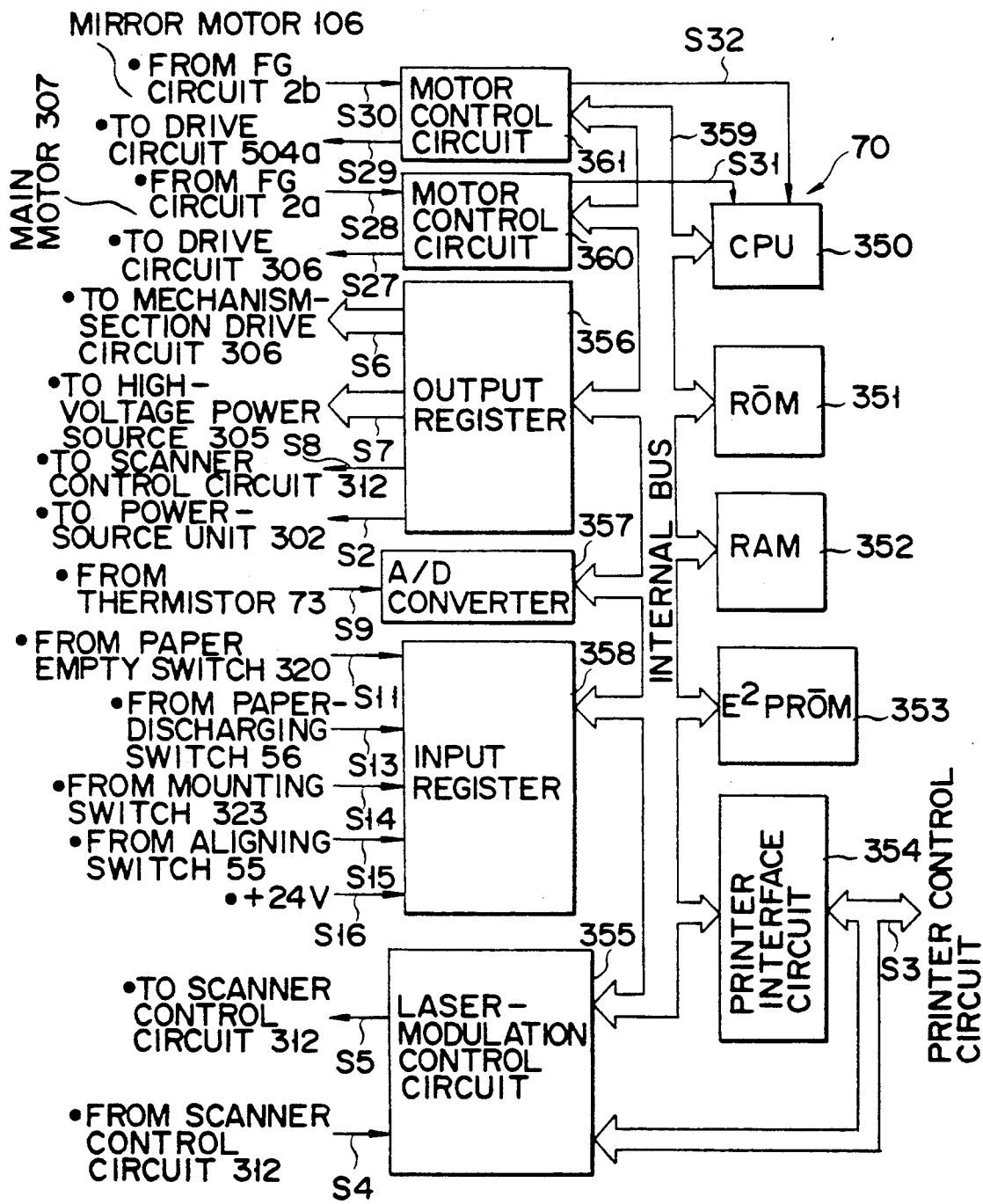
F I G. 4

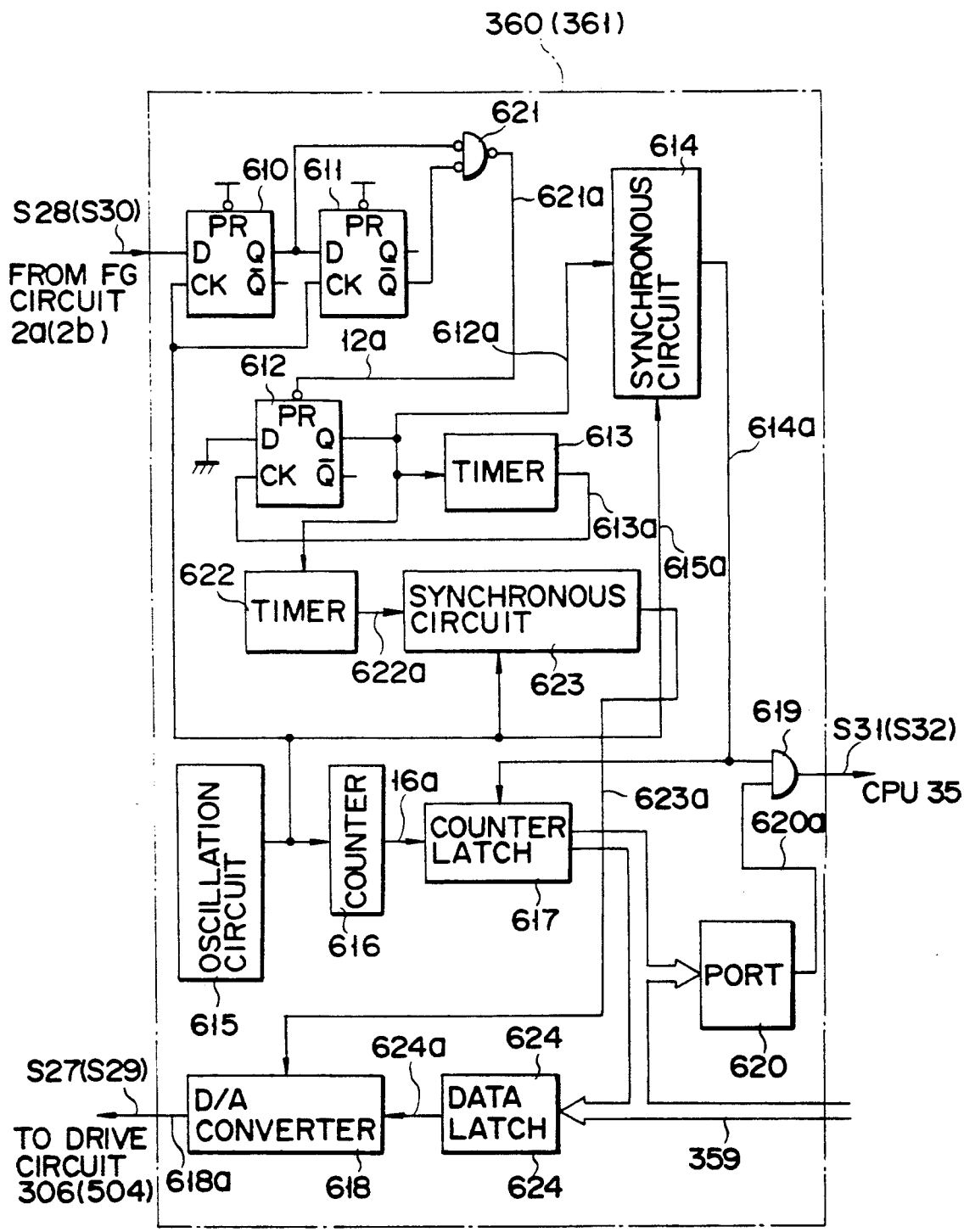
F I G. 5

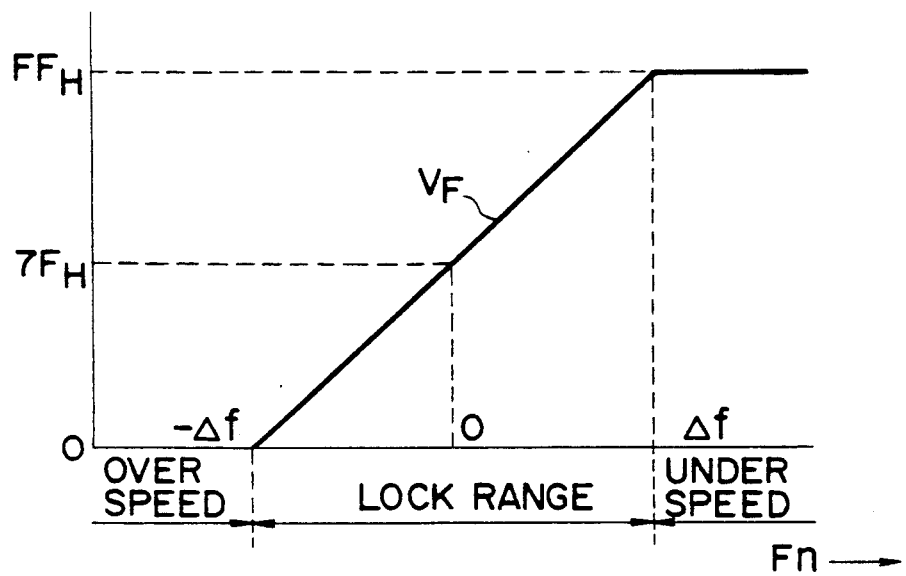
F I G. 11
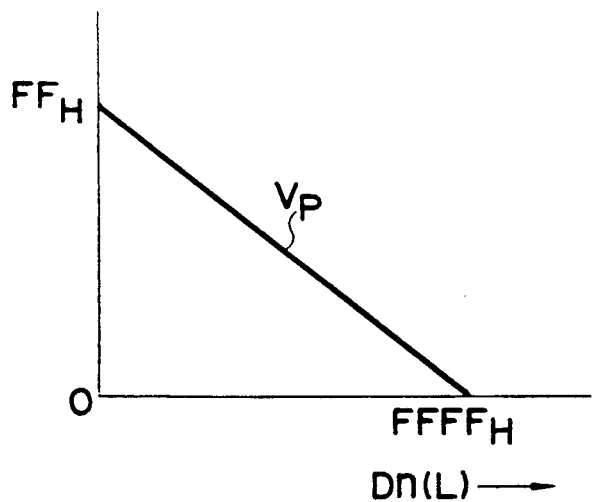
F I G. 12

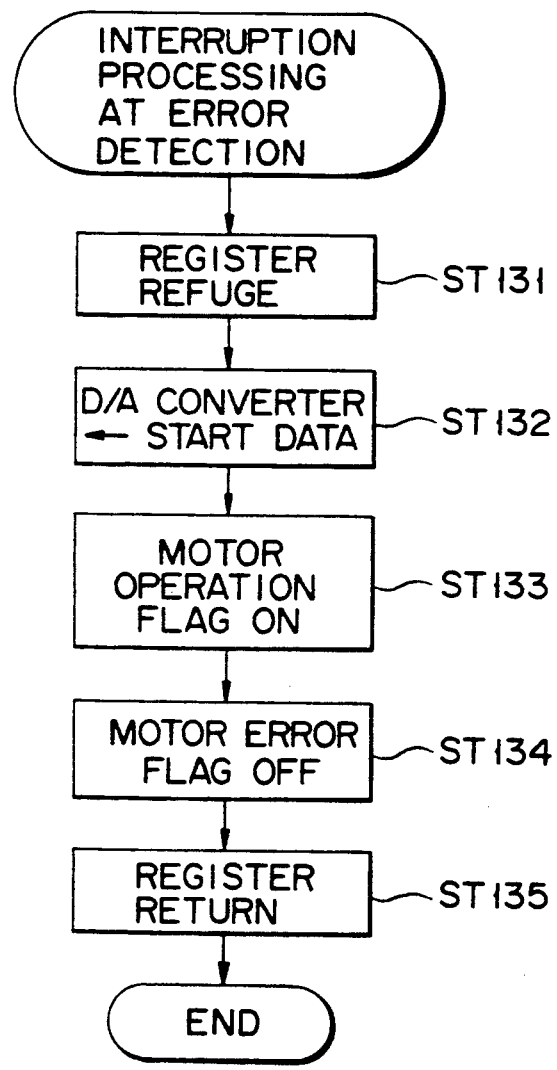
F I G. 19

IMAGE FORMING APPARATUS WITH GOOD RESPONSE MOTOR SERVO CONTROL

BACKGROUND OF THE INVENTION

1. Field of the Invention

The present invention relates to a controller of and more particularly to a motor controller for image forming apparatus, for example, laser printers.

2. Description of the Related Art

Heretofore, in an forming of image forming apparatus, laser printers has been performed through processes such as charging, exposure, development, transfer, stripping, cleaning and fixing. Such an image forming apparatus is equipped with a charging unit, and exposure unit, a development unit, a transfer unit, a stripping unit and a cleaning unit which are sequentially arranged around a photosensitive drum as an image carrier, and equipped with a fixing unit for receiving a paper from the stripping unit; the apparatus is operated in such a manner that each image forming process is performed by driving the above-described each unit according to the rotary movement of the photo-sensitive drum to form an image on a paper (image-formed medium) fed and carried from a paper feeding cassette. Then, the paper is discharged onto a paper discharging tray.

The laser printer as described above is provided with motors such as a main motor which rotates the photo-sensitive drum, rotates a take-out roller for taking out a paper, and drives a carrying mechanism for carrying the paper, and a mirror motor which rotates a rotary mirror built in the exposure unit using laser beam.

Accordingly, for the motors used in the laser printer as described above, their revolution speed has been kept stable, even if load torque, source voltage and ambient temperature vary, by controlling their phase in such a manner that the phase of their frequency is synchronized with that of a stable standard frequency produced by a crystal oscillator as a standard oscillator, or in addition to the phase control, by controlling their frequency to compare with the standard frequency. Thus, a software servo control has been provided which uses a CPU to determine the difference between the phase of motor revolution frequency and a standard frequency, and the difference between the motor frequency and the standard frequency, and calculate a supply voltage to the responding motors so as to provide a stable rotating speed.

A software servo control system which controls a plurality of motors by detecting the motor revolution speed in synchronism with a FG pulse as an revolution frequency signal of different frequencies detected from a plurality of motors to compare with a standard frequency by use of an interruption processing program has a disadvantage that a CPU cannot execute the next interruption processing during execution of an interruption processing responding to frequency signal in normal operation, or before a currently-executed interruption processing is finished even if another frequency signal with a high standard frequency occurs, so that the higher standard frequency of the FG signal that the software servo control system deals with, the ratio of control delay time due to processing waiting to the revolution sampling frequency, thereby preventing servo control with a good response characteristic.

SUMMARY OF THE INVENTION

The present invention has been provided to eliminate such a disadvantage that a motor servo control with a good response characteristic cannot be obtained because of a long delay time for motor control in controlling a plurality of motors, and its object is to provide a controller of motors which can minimize the delay time for a motor control in controlling a plurality of motors so as to perform a motor servo control with a good response characteristic.

An image forming apparatus according to the present invention comprises: means for forming an image on an image bearing member; a plurality of means for driving the image forming means, the plurality of driving means being driven and controlled by predetermined frequency signals; means for detecting the predetermined frequency signals; means for calculating a frequency difference and a phase difference between a revolution frequency and a standard frequency by use of the frequency signal from the detecting means; and means for causing the calculating means to execute preferentially a calculation process to the driving means to be driven by a higher frequency signal when the higher frequency signal than a frequency signal being calculated by the calculating means is detected by the detecting means during a calculation process by the calculating means.

The image forming apparatus comprises: an image bearing member; means for forming a latent image on the image bearing member, the forming means having a polygon mirror means for exposing a light on the image bearing means; first motor means for driving the polygon mirror means, the first motor means being driven and controlled by a first frequency signal; second motor means for driving the image bearing member, the second motor means being driven and controlled by a second frequency signal higher than the first frequency signal; means for detecting frequency signals to drive the first and second motor means; means for calculating a frequency difference and a phase difference between a revolution frequency and a standard frequency by use of the frequency signal from the detecting means; and means for causing the calculating means to execute preferentially a calculation process to the second motor means when a frequency signal of the second motor means is detected by the detecting means during a calculation process to the first motor means by the calculating means.

An image forming apparatus comprises: means for forming an image on an image bearing member; a plurality of means for driving the image forming means, the plurality of driving means being driven and controlled by predetermined frequency signals respectively; first timer means for serving to start an operation on the basis of a revolution frequency signal S28 (S30) of the driving means and to operate during a period shorter than the period of a revolution frequency signal obtained when the driving means are rotated at a predetermined revolution frequency while inhibiting receipt of another revolution frequency, signal during the period; second timer means for starting an operation on the basis of a revolution frequency signal of the driving means, and to operate during a period which is shorter than a period of a revolution frequency signal obtained when the driving means are rotated at a predetermined revolution frequency and is longer than a process time of interruption processing program executed by an interruption request signal generated by the revolution frequency signal, and to output an amount of power-supply control calculated by the interruption processing program to power-supply control means; and third timer means for serving to start an separation on the basis of a revolution frequency signal of the driving means, and to operate during a period which is longer than a period of a revolution frequency signal obtained when the driving means are rotated at a predetermined revolution frequency, and re-operate upon receipt of another revolution frequency signal during the operation while detecting no receipt of another revolution frequency signal.

The present invention is arranged in such a manner that an image formation acting on an image carrier is performed by image formation means; the image formation means is driven by a first and a second motors; a frequency signal according to the revolution speed of the first and second motors is detected by first and second detection means; a frequency difference and a phase difference between the revolution frequency and the standard frequency of respective motors are calculated by use of the frequency signal from those detection means; according to the frequency difference and the phase difference having been calculated, a power supply to the respective first and second motors is controlled by first and second power-supply control means; and the control of a power supply to the first motor by the first power-supply control means is switched to the control of a power supply to the second motor by the second power-supply control means when a frequency signal to the second motor with a rapid detection cycle by said second detection means is outputted from the said second detection means in a condition that a power supply to the first motor is controlled by said first power supply control means.

The present invention is arranged, in such a manner that an image carrier is charged; said changed image carrier being exposed by the exposure means; an electrostatic latent image having been formed on said image carrier by the exposure is developed by the development means; a developer image having been developed is transferred to an image-formed medium; the image-formed medium to which the developer image has been transferred is fixed; said exposure means is driven by a first motor; said image carrier and the development means is driven by a second motor; a frequency signal according to the revolution speed of said first and second motors is detected by first and second detection means; a frequency difference and a phase difference between the revolution frequency and the standard frequency of respective first and second motors are calculated by use of the frequency signal from those detection means; according to the frequency difference and the phase difference having been calculated, a power supply to respective first and second motors is controlled by first and second power supply control means; and the control of a power supply to the first motor by the first power-supply control mean is switched to the control of a power supply to the second motor by the second power-supply control means when a frequency signal to the second motor with a rapid detection cycle by said second detection means is outputted from the said second detection means in a condition that a power supply to the first motor is controlled by said first power-supply control means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a block diagram of the principal part of an engine control section in FIG. 1;

FIG. 4 is a block diagram of an engine control circuit in FIG. 3;

FIG. 5 is a block diagram of a motor control circuit in FIG. 2;

FIG. 11 is a characteristic graph for showing the synchronization difference of a motor and a frequency control amount;

FIG. 12 is a characteristic graph for showing a phase difference of a main motor and a phase control amount;

FIG. 19 is a flowchart for explaining the interruption processing at error detection.

DETAILED DESCRIPTION OF THE PREFERRED EMBODIMENTS

With reference to drawings, one embodiment of a controller of motors according to the present invention will be explained hereinafter, taking an image forming apparatus as an example.

Figure 1:
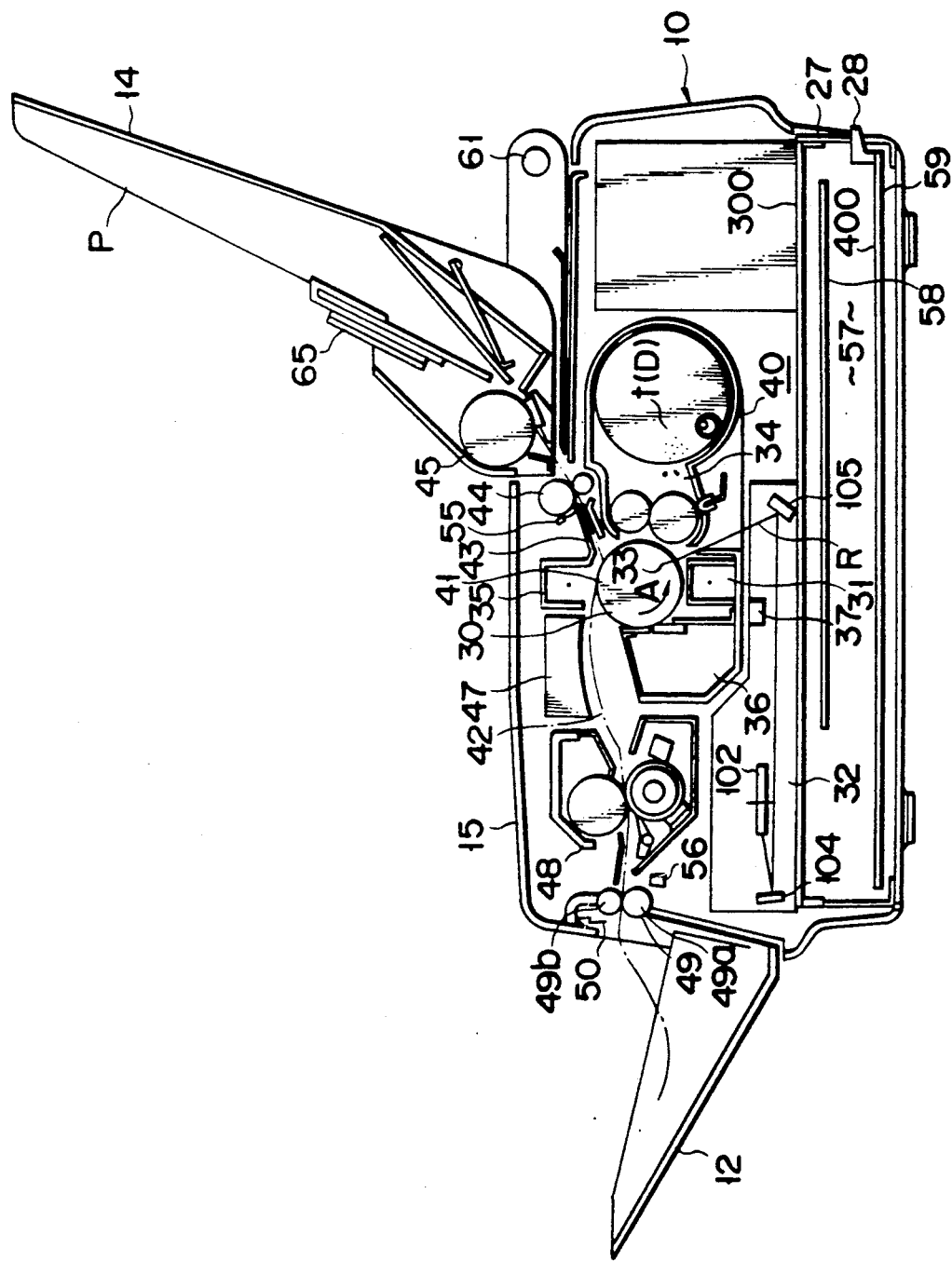
FIG. 1 is a schematic longitudinal sectional side view for showing the internal configuration of an image forming apparatus to which a motor controller according to the present invention can be applied.

FIG. 1 is a schematic longitudinal sectional side view showing the internal configuration of a laser printer as an image forming apparatus to which a controller of motors according to the present invention can be applied. A photosensitive drum 30 as an image carrier is provided at the center of a main body 10. Arranged sequentially around it are a charger 31 consisting of a scorotron as a charging means, an exposure section 33 for receiving a laser beam irradiated from a laser exposure unit 32 as the electrostatic latent image formation means, a nonmagnetic one-component type development unit 34 as the development means, a transfer charger 35 consisting of a corotron as the transfer means, a drum cleaner 36 as the cleaning means, a preexposure unit 37 as the preexposure means, positioned on the periphery of the photo-sensitive drum 30 along the rotational direction shown by arrow A. Also, photosensitive drum 30, charger 31, development unit 34 and drum cleaner 36 are integrated to form removable process cartridge 40 in the main body 10.

Further, in the main body 10, a paper carrying path 42 passing through an image transfer section 41 formed between the photosensitive drum 30 and the transfer charger 35, is provided. On the upstream side of image transfer section 41 of the paper carrying path 42, a paper guide 43, a pair of aligning rollers 44, a paper feeding roller 45 and a paper cassette 14 are arranged. Also, on the downstream side of the image transfer section 41, a paper carrying guide 47, a heat roller type fixing unit 48 as a fixing means and a pair of paper discharging rollers 49, are arranged. The pair of paper discharging rollers 49, consisting of a lower roller 49a and an upper roller 49b, are provided in their carrying direction with a static-eliminating brush 50 in contact with the non-image forming face of a paper P. A paper empty switch 320 (FIG. 2), for detecting the paper P in the paper cassette 14, is provided near the paper feeding roller 45, an aligning switch 55 near the pair of aligning rollers 44, and a paper discharging switch 56 near the pair of paper discharging rollers 49, so as to detect paper P.

Also, an engine control section 300 and a printer control section 400 are arranged in a board housing 57 provided in the lower portion of the equipment body 10. In the engine control section 300 is an engine control board 58 carrying an engine control circuit (FIG. 4) which controls electrical units provided in the equipment body 10 so as to control the operation to complete electrophotographic process. In the printer control section 400 is a printer control board 59 carrying a printer control circuit for controlling the operation of the engine control board 58. The printer control board 59 is designed in such a manner that a maximum of two boards can be mounted according to the extent of additional function (e.g., the extension of types of typefaces and Chinese characters), and its functions can be increased by inserting an IC card for additional function (FIG. 3) into three connectors for IC cards (not shown) located on the side edge of the printer control board 59. On the back of the printer control board 59 located on the lowest stage, connectors 28 and 28 are installed in a condition that the connectors project beyond a shield case 27 is provided on the lower back of the main body 10.

When image forming operation is performed, the photosensitive drum 30 is rotated, its surface potential is kept constant by the action of the preexposure unit 37, and then the photosensitive drum 30 is uniformly charged by the action of the charger 31 and scan-exposed on its surface to laser beam by use of laser exposure unit 32, thereby forming an electrostatic latent image corresponding to an image signal. The electrostatic latent image on the photosensitive drum 30 is developed by the development unit 34, which uses a one-component developer D consisting of a toner t, as a toner image, fed to the image transfer section 41.

On the other hand, the paper taken out from the paper cassette 14 or manually inserted from a hand-insertion guide 65 in synchronism with the forming operation of the toner image is fed through the pair of aligning rollers 44 and the paper guide 43 to the image transfer section 41, where said toner image previously formed on the photosensitive drum 30 is transferred to the paper P by the action of the transfer charger 35. Then, with the guide of the carrying guide 47, the paper P passes through the paper carrying path 42, fed to the fixing unit 48, and passes between a roller 68 and a roller 68, whereby said toner image is melt-fixed to the paper P. Thereafter, the paper P is discharged through the pair of paper discharging rollers 49 to the paper discharging tray 12. After the toner image has been transferred to the paper P, the remaining toner on the photosensitive drum 30 is removed by the drum cleaner 36.

Figure 2:
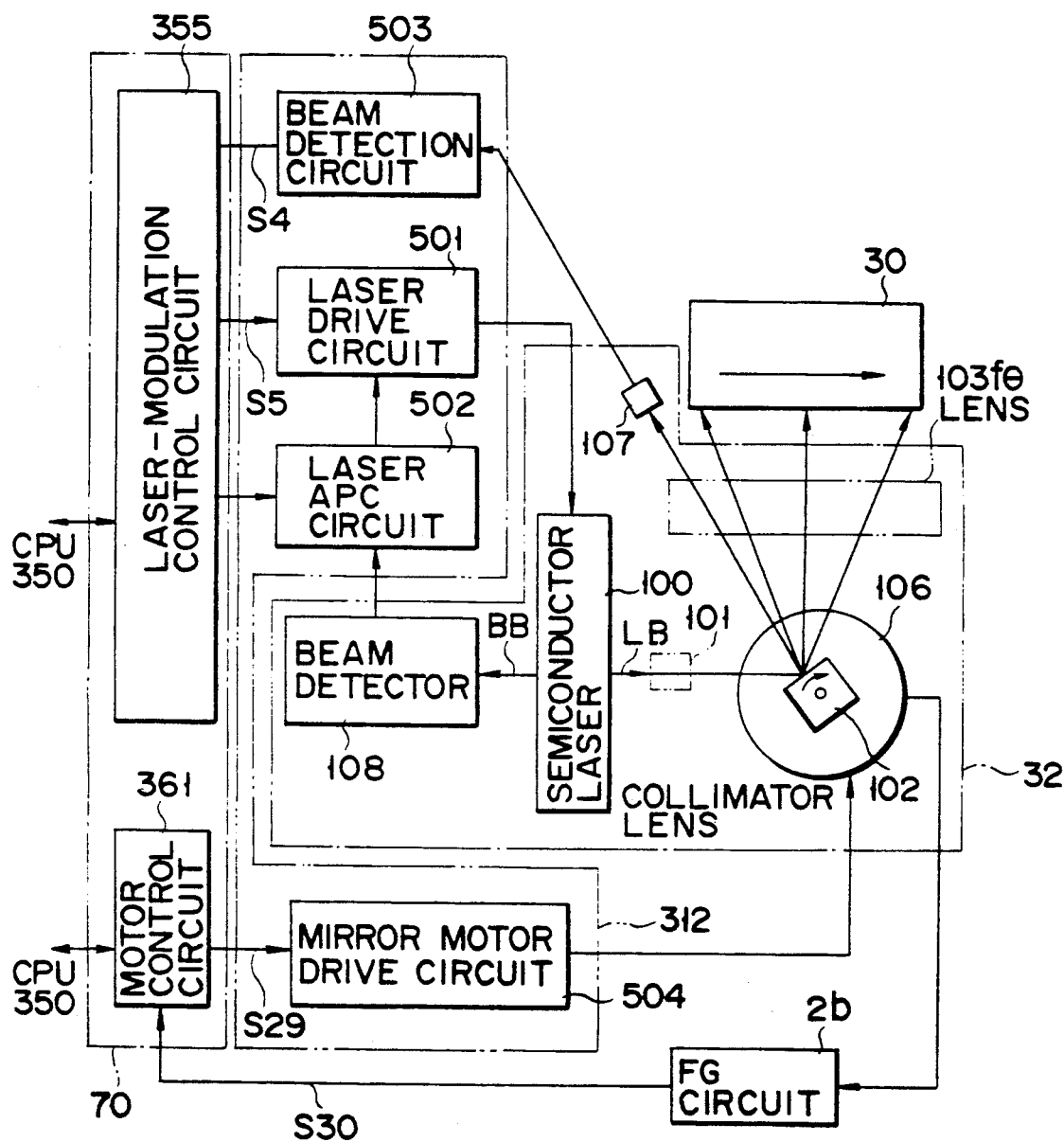
FIG. 2 is a block diagram of a laser exposure unit and a scanner control circuit in FIG. 1.

FIG. 2 is a block diagram showing the configuration of the laser exposure unit 32 and a scanner control circuit 312 in FIG. 1. As shown in FIG. 2, the laser exposure unit 32 comprises a semiconductor laser oscillator 100 for generating a laser beam; a collimater lens 101 for correcting a laser beam LB from the semiconductor laser oscillator 100; a polygon mirror 102 as a rotator having a four-surface mirror section which reflects the laser beam from the colimater lens 101 for each scan line; an f-$\theta$ lens 103 and mirrors 104 and 105 for introducing the laser beam polarized by the polygon mirror 102 to the photosensitive drum 30; a mirror motor 106 for rotating (driving) through direct drive mechanism the polygon mirror 102 at a certain speed; a beam detector 107 being provided outside information recording region for detecting the laser beam polarized by the polygon mirror 102 to generate a current signal; and a beam detector 108 for detecting a laser beam BB outputted backward from the semiconductor laser oscillator 100 to generate a detected output according to the intensity of the laser beam. A frequency signal proportional to the revolution speed of the mirror motor 106 is detected by an FG (Frequency Generator) circuit 2b.

The FG circuit 2b shapes a signal generated by, for example, a tachogenerator consisting of a detection coil or a magnetic sensor and magnet, or by a shaft encoder consisting of a photo-interrupter and a slit disc, and outputs a FG pulse S30 as a frequency signal. The mirror motor 106 is driven by a mirror motor drive circuit 504 under the control of a motor control circuit 361 (described later). For example, the mirror motor 106 is rotatably controlled at 8,100 rpm, where one rotation causes the FG circuit 2b to generate one pulse of the FG pulse S30. Accordingly, the frequency of the FG pulse S30 when the mirror motor 106 is stably rotated at 8,100 rpm becomes $(8,100/60) \times 1 = 135$ Hz.

As shown in FIG. 2, the scanner circuit 312 comprises a laser drive circuit 501, a laser Auto Power Control (APC) circuit 502, a beam detection circuit 503, and the mirror motor drive circuit 504. The laser drive circuit 501 drives the semiconductor laser oscillator 100 in response to a laser modulation signal S5 from a laser modulation control circuit 355 (FIG. 4) in the engine control circuit 70. The laser APC circuit 502 controls the laser drive circuit 501 according to the detected output from the beam detector 108 to keep constant the output luminous energy of the laser beam from the semiconductor laser oscillator 100. The beam detection circuit 503 converts the current signal generated by the beam detector 107 into a voltage signal to output a laser beam detected signal S4 as a synchronizing signal to the laser modulation control circuit 355 (FIG. 4). The mirror motor drive circuit 504 rotates the mirror motor 106 at a high speed, according to a power supply control signal S29 from a motor control circuit 361 (FIG. 4) in the engine control circuit 70.

When an image forming operation is performed, a laser beam from the laser exposure unit 32 corresponding to an image signal from an external appliance (not shown) or an operation panel 13 is focused into an image on the surface of the photosensitive drum 30. The photosensitive drum 30 rotates in the arrow direction of FIG. 1. its surface is first charged by the charger 31, and then exposed correspondingly to the image signal by the laser exposure unit 32. That is, the laser beam generated from the semiconductor laser oscillator 100 is scanned at a certain speed from left to right of the photosensitive drum 30 with the rotation of the polygon mirror 102 by the mirror motor 106, whereby an electrostatic latent image is formed on the surface of the drum. A toner is placed on the electrostatic latent image by the development unit 34, whereby the image is made visible.

FIG. 3 is a block circuit diagram showing the configuration of the principal part of the engine control section 300. A power source unit 302 outputs +5 V and +24 V source voltages by turning on a power source switch 17. The +5 V source voltage is supplied to an engine control circuit 70, and through the engine control circuit 70 to a printer control circuit 71 of the printer control section 400. On the other hand the +24 V source voltage is supplied sequentially through a cover switch 303 and other components to the engine control circuit 70, and through the engine control circuit 70 to scanner control circuit 312, high voltage source 305 and mechanism-section drive circuit 306. The voltage is supplied from the scanner control circuit 312 to the semiconductor laser oscillator 100 and the mirror motor 106, and from the mechanism-section drive circuit 306 to the preexposure unit 37, a main motor 307, a cassette paper feeding solenoid 309 and an aligning solenoid 310 so that the voltage is the drive source of these units. The main motor 307 rotatably drives the photosensitive drum 30, the pair of aligning rollers 44, the paper feeding roller 45, the pair of paper discharging rollers 49 and a heat roller 68. A frequency signal proportional to the revolution speed of the main motor 307 is detected by an FG (Frequency Generator) circuit 2a. The FG circuit 2a shapes a signal generated by, for example, a tachogenerator consisting of a detection coil or a magnetic sensor and a magnet, or by a shaft encoder consisting of a photo-interrupter and a slit disc, and outputs a FG pulse S28 as a frequency signal. The main motor 307 is driven by the mechanism-section drive circuit 306 under the control of a motor control circuit 360 (FIG. 4) described later. For example, the main motor 307 is rotatably controlled at 2,100 rpm, where one rotation causes the FG circuit 2a to generate 24 pulses of the FG pulse S28. Accordingly, the frequency of the FG pulse S28 when the main motor 307 is being stably rotated at 2,100 rpm becomes $(2,100/60) \times 1 = 840$ Hz.

Further, in the power source unit 302, a zerocross switch type heater lamp drive circuit (not shown) is provided consisting of, for example, a photo-triac coupler and a triac for driving a heater lamp in the fixing unit 48. The +24 V is used for the drive power source of an emission side LED of the photo-triac coupler. In the heater lamp drive circuit with such configuration, as well known, when the emission side LED is turned on/off, the emission side photo-triac is turned on/off at the zerocross point of an alternate current power source, thereby turning on/off the triac being a main switch element of the next stage to energize or cut off an alternate current power source S1 to the heater lamp 67. A heater control signal S2 for turning on/off the emission side LED is supplied from the engine control circuit 70 to the power source unit 302. A temperature signal detected by a thermistor 73 provided in the fixing unit 48 is supplied to the engine control circuit 70.

The cover switch 303 is designed to be off when an upper cover 15 is rotatably operated upward. Accordingly, in a condition that the upper cover 15 is opened, the +24 V is cut out by the switch 303, so that the operation of the semiconductor laser oscillator 100, the mirror motor 106, the high voltage power source 305, the main motor 307, the cassette paper feeding solenoid 309, the aligning solenoid 310 and the heater lamp 67 is stopped, whereby no trouble occurs even if an operator touches the inside of the equipment body 10. In the mechanism-section drive circuit 306, a drive circuit for driving the main motor 307 and solenoids 309 and 310 is provided. High voltage signals of a development bias S20, a charging S22 and a transfer S24 are outputted from the high voltage power source 305 to a development bias power supply section (not shown), and wire high voltage power supply sections (not shown) of the charger 31 and the transfer charger 35, respectively.

As described above, in the engine control section 300 shown in FIG. 3, power source is supplied through the engine control circuit 70 to each electric circuit, and each unit is controlled by a two value control signal outputted from the engine control circuit 70. The engine control section 300 and the later-described printer control section 400 are in a condition that they are connected to each other by an interface signal S3.

FIG. 4 is a block diagram showing the configuration of the engine control circuit 70 in FIG. 3. A central processing unit (CPU) 350, which controls the entire engine control section 300 and rotatably controls the main motor 307 and the mirror motor 106, is designed in a manner to be operated according to control programs such as the main program and interruption processing program stored in a ROM 351. For example, the operation of the CPU 350 is such that the CPU branches from the main program to the interruption processing program during performing the main program in response to interruption request signals S31 and S32 supplied from the motor control circuits 360 and 361 so as to read within the interruption processing program the counter value of a later-described counter latch 617 (FIG. 5) in the motor control circuits 360 and 361.

A RAM 352 is a working buffer of the CPU 350. The total number of printed sheets and the like are stored in an $E^2PROM$ 353. A printer interface circuit 354 mediates the delivery of the interface signal S3 from and to the printer control circuit 71. The laser modulation control circuit 355 lights forcedly and cyclically the semiconductor laser oscillator 100 in order to generate a laser beam detected signal S4 from a beam detection circuit 503 in the scanner control circuit 312 (FIG. 2), and modulates the semiconductor laser oscillator 100 according to the image data supplied from the printer control circuit 71 by the interface signal S3. The laser modulation control circuit 355 also outputs a laser modulation signal S5 into a laser drive circuit 501 in the scanner control circuit 312.

An output register 356 outputs control signals S6, S7, S8 and S2, which control the mechanism-section drive circuit 306, the high voltage power source 305, the scanner control circuit 312 and the heater lamp drive circuit, respectively. A voltage signal S9, generated by the thermistor 73, is inputted into an A/D converter 357, where its voltage value is converted into a digital value. Into an input register 358 are. inputted state signals S11, S13, S14 and S15 from a paper empty switch 320 (FIG. 6), the paper discharging switch 56, the aligning switch 55 and a mounting switch 323, and an on/off state signal S16 of the +24 V. The motor control circuit 360 outputs a power supply signal S27 corresponding to an FG pulse S28 from the FG circuit 2a to the mechanism-section drive circuit 306 to rotatably and stably control the main motor 307. The motor control circuit 361 outputs a power supply signal S29 corresponding to an FG pulse S30 from the FG circuit 2b to the mirror motor drive circuit 504 to rotatably and stably control the mirror motor 106. The motor control circuits 360 and 361 will be further explained in detail in connection with FIG. 5. An internal bus 359 performs mutually data delivery between the CPU 350, ROM 351, RAM 352, E$^2$PROM 353, the printer interface circuit 354, the laser modulation control circuit 355, the output register 356, the A/D converter 357, the input register 358, and the motor control circuits 360 and 361. The drive circuit of the mechanism-section drive circuit 306 is on/off controlled by the two value control signal S6 outputted from the output register 356. That is, for example, each drive circuit becomes on when the signal is "1", or becomes off when "0", so that the +24 V is supplied or cut off to the preexposure unit 37, the main motor 307, and the solenoids 308 through 311. Further, the on/off of the high voltage power source 305 is controlled by the "1" and "0" of the control signal S7 outputted from the output register 356.

FIG. 5 is a block diagram showing the configuration of a motor control circuit 360 (361) in FIG. 2. The circuit comprises D type Flip Flops (FF circuits) 610, 611 and 612, timers 613 and 622, synchronous circuits 614 and 623, a data latch 624, an oscillation circuit 615, a counter 616, a counter latch 617, a D/A converter 618. AND circuit 619, a port 620, and an OR circuit 621. The FG signal S28 from the FG circuit 2a is inputted into the data terminal D of the FF circuit 610, where its set output Q is outputted to the data terminal D of the FF circuit 611 in the succeeding stage. A clock signal 615a from the oscillation circuit 615 is inputted into the clock terminal CK of said FF circuits 610 and 611, each of which; in turn, operates in synchronism with the clock signal 615a. The frequency of the oscillation signal from said oscillation circuit 615 is determined by a crystal oscillator (not shown), and set to, for example, 55.050240 MHz. This generates a standard cycle, that is, the cycle of the FG pulse S28 when the main motor 307 rotates at a target revolution speed to become $(65536/55.050240 \times 10^6) = 1.190 \times 10^{-3}$ (sec). The clock signal 615a from the oscillation circuit 615 is outputted into the synchronous circuits 614 and 623.

Figure 6A:
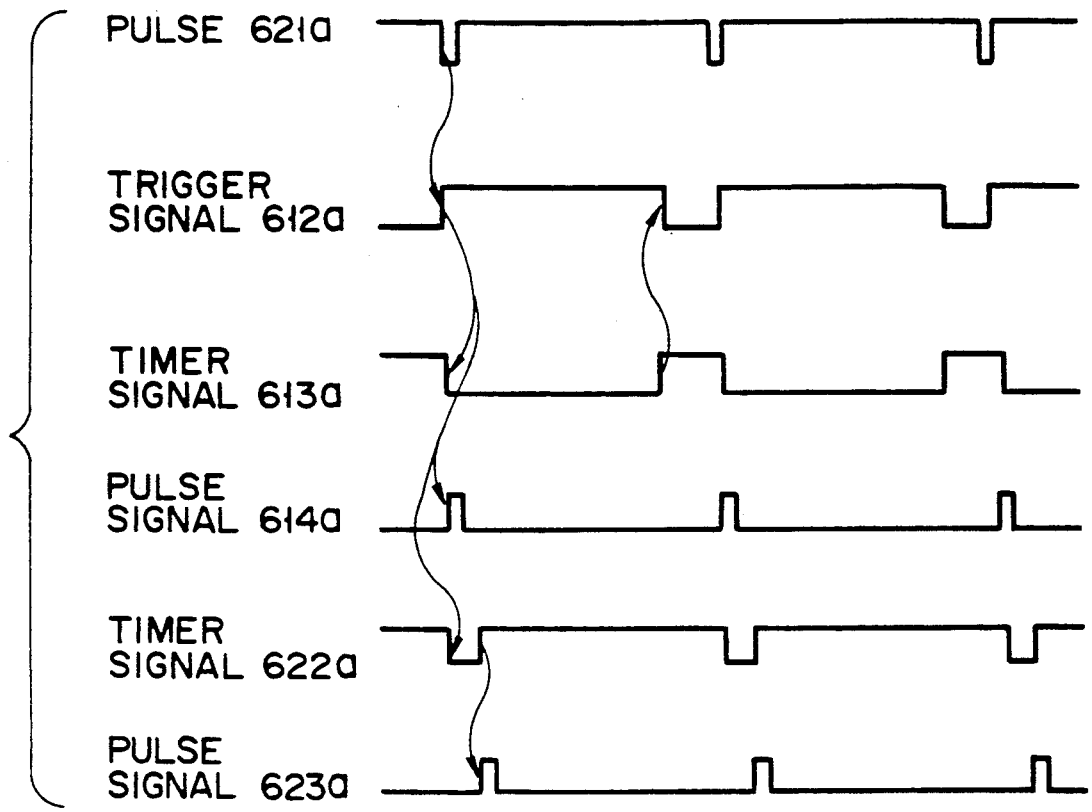
FIGS. 6A and 6B are timing charts for explaining the operation of each part of the motor control circuit in FIG. 5.
Figure 6B:
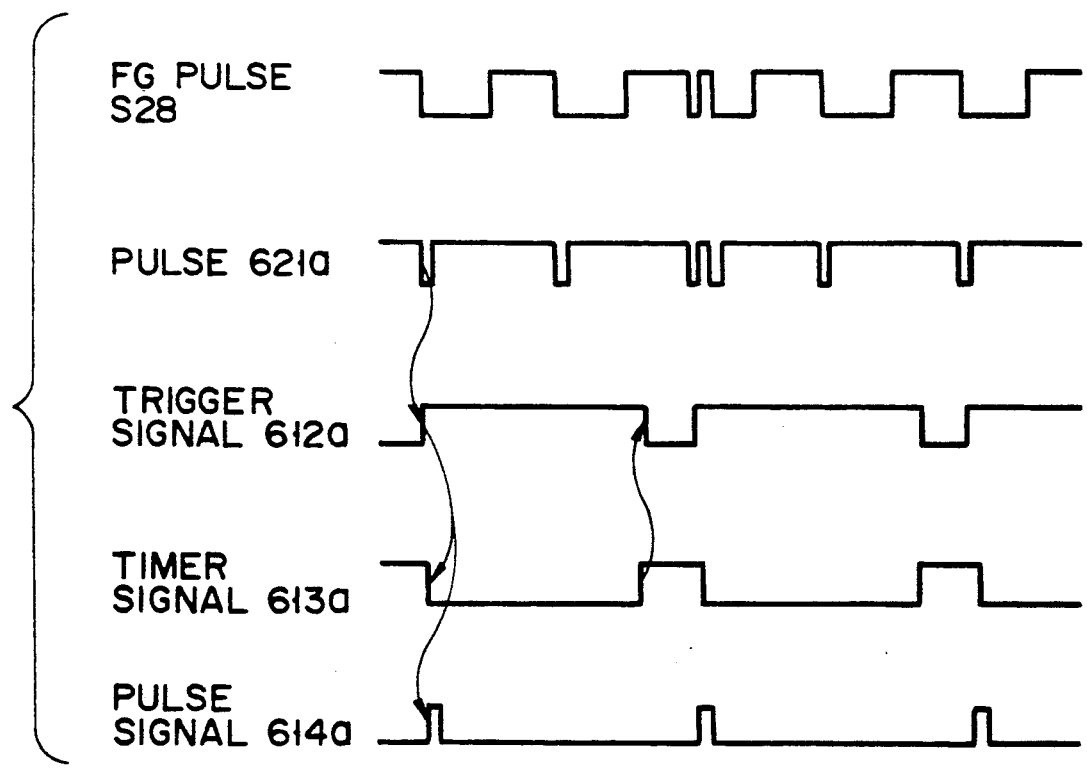

FIGS. 6A and 6B are timing charts to explain the operation of each part of the motor control circuit 360 (361) in FIG. 5 the set output Q of the FF circuits 610 and a reset output $\overline{Q}$ of the FF circuit 611, as shown in FIG. 6A, output a pulse 612a corresponding to one clock of the clock signal 615a. The pulse 612a is inputted into the preset terminal PR of the D type Flip Flops (FF circuits) 612. The set output Q of the FF circuits 612 as a trigger signal 612a is outputted to the timers 613 and 622, and the oscillation circuit 614. Then, a timer signal 613a from the timer 613 is outputted to the clock terminal CK of the FF circuit 612. At that time, the timer 613, as shown in FIG. 6A, performs an operation such that the timer synchronizes with the rise of the trigger signal 612a. and outputs ("0") the timer signal 613a for a specified time to reset ("0") the trigger signal 612a. The synchronous circuit 614 generates a pulse signal 614a having a specified pulse width, in synchronism with the clock signal 615a from the trigger signal 612a. Also, a timer signal 622a of the timer 622 is outputted to the synchronous circuits 623. At that time, the timer 622, as shown in FIG. 6A, synchronizes with the rise of the trigger signal 612a, and outputs ("0") the timer signal 622a for a specified time. The synchronous circuits 623 generates a pulse signal 623a having a specified pulse width in synchronism with the clock signal 615a at the rise of the timer signal 622a.

The counter 616 is a 20 bit free running counter which operates the clock signal 615a as a count clock. A counter value 616a of the counter 616 is latched in the counter latch 617 by making the pulse signal 614a a latch signal, and read through the data bus 359 into said CPU 350. The pulse signal 614a from the synchronous circuits 614 and an interruption control signal 620a from the port 620 are inputted into the AND circuit 619. The output of the AND circuit 619 as an interruption request signal S31 is supplied to the CPU 350. That is, when data is supplied from the CPU 350 to the port 620, and the interruption control signal 620a is 0, the interruption request signal S31 is always 0, so that the CPU 350 performs no interruption processing. On the other hand, when the interruption control signal 620a is 1, the interruption request signal S31 is equal to the pulse signal 614a. At that time, the CPU 350, in synchronism with the generation of the pulse signal 614a, branches from the main program into the interruption processing program during performing the main program so as to read within the interruption processing program the counter value of the counter latch 617.

Power supply data having a digital quantity which is calculated by the later-described interruption processing, that is, by frequency difference and phase difference, is supplied from the CPU 350 through the bus 359 to the data latch 624. The power supply data of the data latch 624 synchronizes with the pulse signal 623a from the synchronous circuits 623 so as to be fetched into the D/A converter 618. The D/A converter 618, which converts the power supply data having a digital quantity having been supplied, into a voltage and outputs it, employs, for example, a 8 bit D/A converter using an R-2R ladder type resistance network. The control voltage output of the D/A converter 618 as a power supply control signal 618a is supplied to the succeeding stage drive circuit 306, which in turn supplies power to the main motor 307 according to the voltage value of the control voltage output. The motor control circuits 360 (361) comprise a single semiconductor integrated circuit integrated into one chip. This allows a circuit to be easily integrated by a semiconductor integration technique such as gate array to realize sufficiently reduce costs.

In the above-described configuration, even if the revolution speed of the main motor 307 increases excessively, or the waveform of the FG pulse S28 breaks, as shown in FIG. 6B, such change will not affect the trigger signal 612a of the timer 613 during the operation of the timer 613. Accordingly, the input of the FG pulse S28 having a cycle shorter than the timer time is prohibited by the action of the timer 613, so that the pulse signal 614a also is not generated at a cycle shorter than the timer time, whereby the CPU 350 will not become uncontrollable even if an interruption request occurs. The timer time of the timer 613 is set to a value which is somewhat smaller than the cycle of the FG pulse S28 generated when the main motor 307 rotates at a target revolution speed. If the timer 613 is a counter type such that it operates by counting the clock signal 615a, and the counter value can be set by the CPU 350, the timer time could be flexibly produced according to the revolution speed of the main motor 307.

Figure 7:
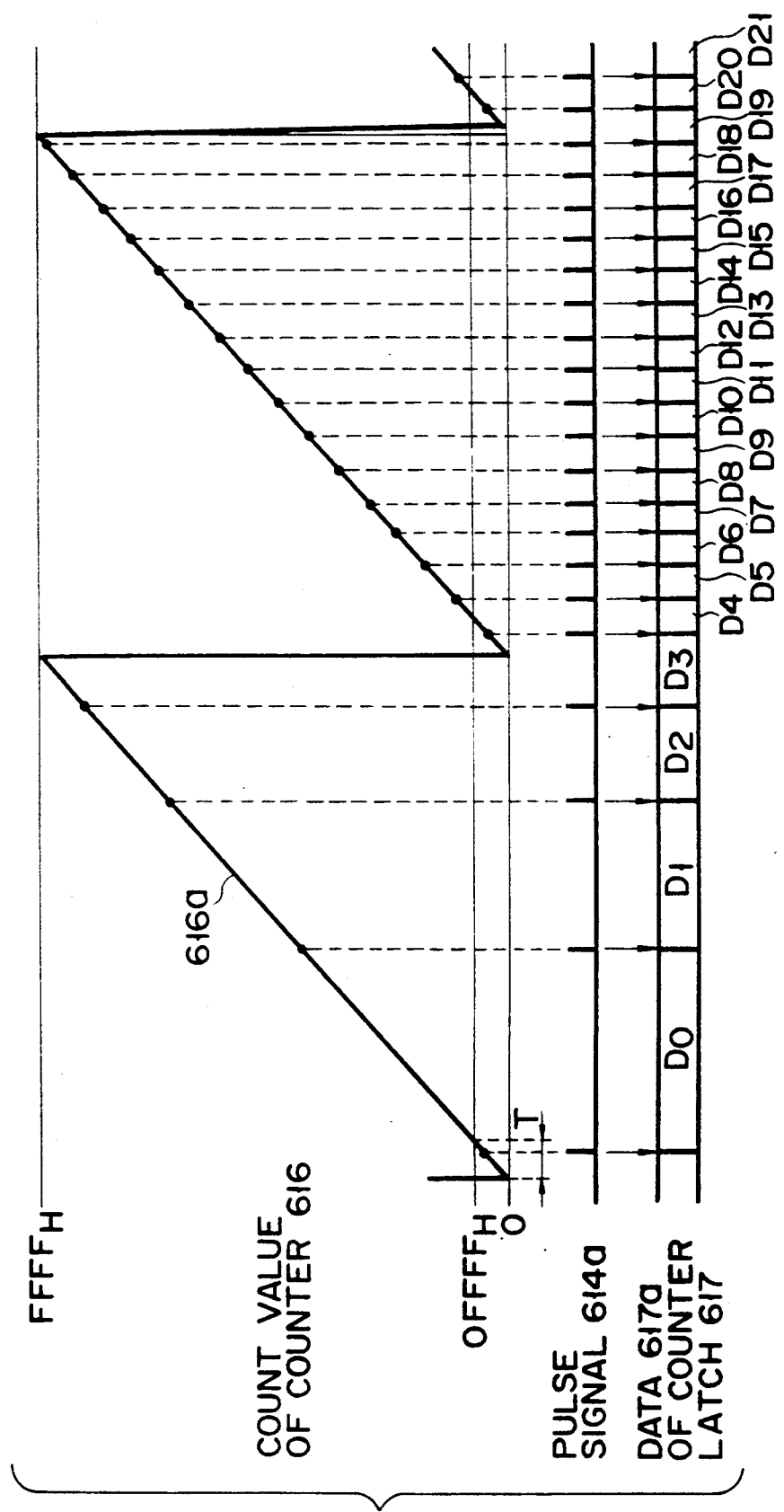
FIGS. 7, 8, 9 and 10 are timing charts for explaining the operation of a counter.

FIG. 7 is a timing chart showing the relationship among the count value 616a of the 20 bit free running counter 616, the pulse signal 614a, and data 617a latched in the counter latch 617. The counter 616 continues the count operation in such a manner that it upcounts the clock signal 615a from 0 to $FFFFF_H$, and returns again back to 0 when the count value reaches the terminal value $FFFFF_H$. At that time, for example, when the main motor is allowed start from stop state, the FG pulse S28 is generated by the FG circuit 2a, and the pulse signal 614a, in synchronism with the pulse, is generated. The pulse signal 614a increases its frequency proportionally to the increase of the revolution speed of the main motor 307, and the count value 616a of the counter 616 is latched as the data 617a by the pulse signal 614a. Now, the target revolution speed of the main motor 307 is set to a time T during which the counter 616 counts $10000_H$. That is, the cycle of the pulse signal 614a when the target revolution speed is reached is given in $1,190 \times 10^{-3}$ (sec).

Figure 8:
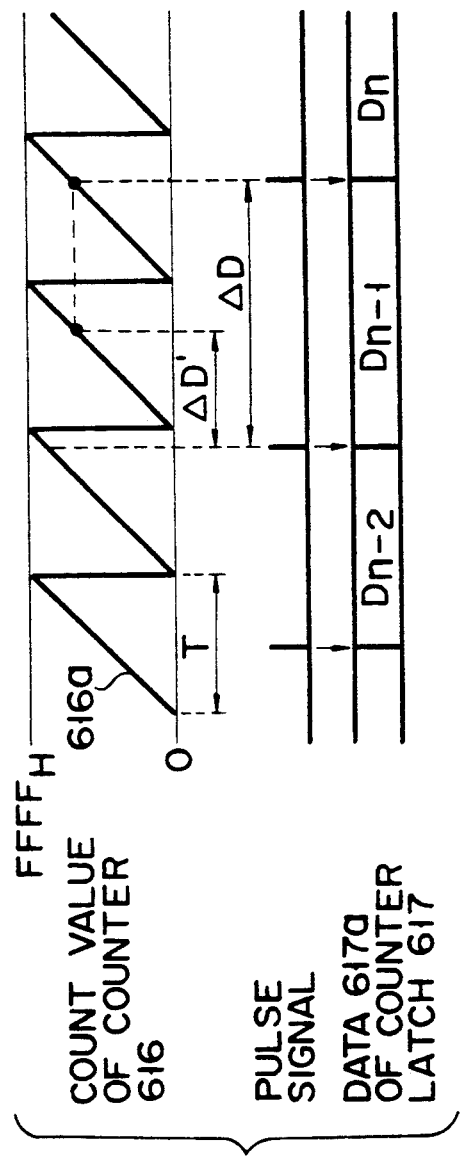

Accordingly, each time the pulse signal 614a is generated, the counter value 616a is latched in the counter latch 617, and at the same time, an interruption request occurs in the CPU 350, so that the CPU 350 reads the data 617a within the interruption program, reads the previous data stored in the RAM 43 by the previous interruption processing, and determines the difference between both of the read values, thereby allowing the cycle of the pulse signal 614a to be determined That is, the revolution speed of the main motor 307 can be determined. Further, comparing the standard value $10000_H$ with the cycle of the pulse signal 614a determines whether the actual speed, is over or under speed compared to the target revolution speed to be determined When the main motor 307 is stably rotating at the target revolution speed, for example, the pulse signal 614a is generated 16 times for the time during which the counter 616 performs a count operation from 0 to $FFFFF_H$. Now, where the counter 616 employs a 16 bit free running counter, and the target revolution speed of the main motor 307 is set to a time T during which the counter 616 counts $10000_H$, with respect to the relationship between data $D_{n-2}$ and data $D_{n-1}$ of the data 617 as shown in FIG. 8, determining the difference between the both values allows the revolution speed of the main motor 307 to be determined.

However, in the case of $D_{n-1}$ and data $D_n$, whether the difference between the both values is $\Delta D$ or $\Delta D'$ is unclear. That is, where at least one cycle during which the counter 616 performs a count operation from 0 to $OFFFF_H$ occurs between two data of the data 617a, it is impossible to determine accurately the revolution speed. Such case often occurs where the revolution speed of the main motor 307 varies very slightly at an approximate target revolution speed, or in a process where the main motor 307 starts and then reaches the target revolution speed.

Accordingly, the maximum number of counts of the counter 616 is required to provide at least two times the number of counts counted for a time corresponding to the target revolution speed ($10000_H$ in the present invention), and the larger the maximum number of counts is provided, the more accurately the measurement of revolution speed from a low revolution can be performed. In the present invention, since the maximum number of counts of the counter 616 is 0 to $FFFFF_H$, the number is 16 times the number of counts $10000_H$ for the time T, whereby no trouble as described above occurs, and the revolution speed can be accurately determined even if the motor rotates at a fraction of the target revolution speed.

Figure 9:
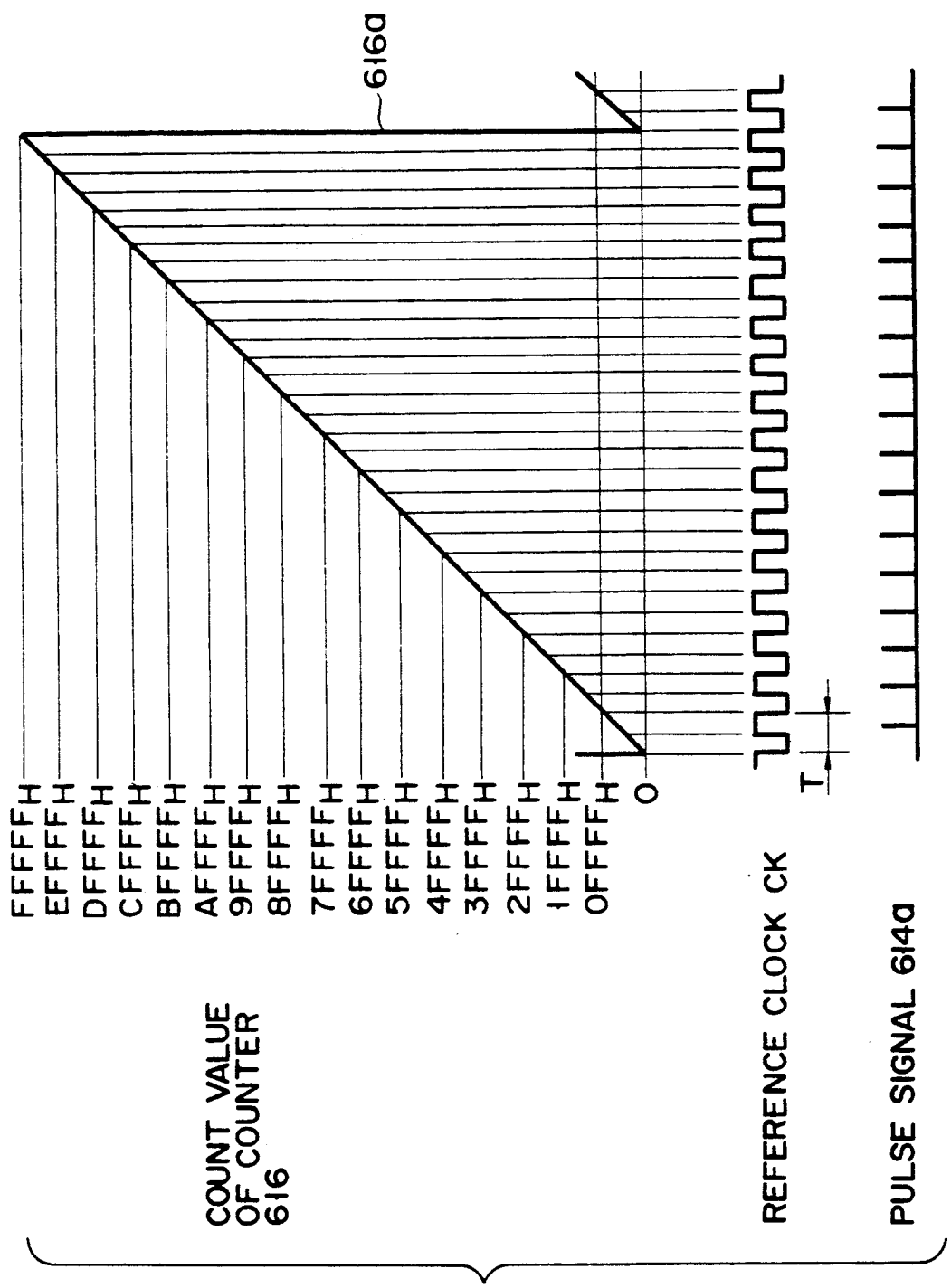

With reference to FIG. 9, the phase difference will be explained hereinafter. As shown in FIG. 9, where the time during which the counter 616 counts $10000_H$ (0 to $0FFFF_H$), that is, the cycle T is taken as the standard cycle of the pulse signal 614a, a standard clock CK can be assumed. Now, for example, assuming that the standard clock CK is a rectangular wave with 50% duty, its phase will be reversed each time the counter 616 counts $8000_H$ (half number of $10000_H$).

Figure 10:
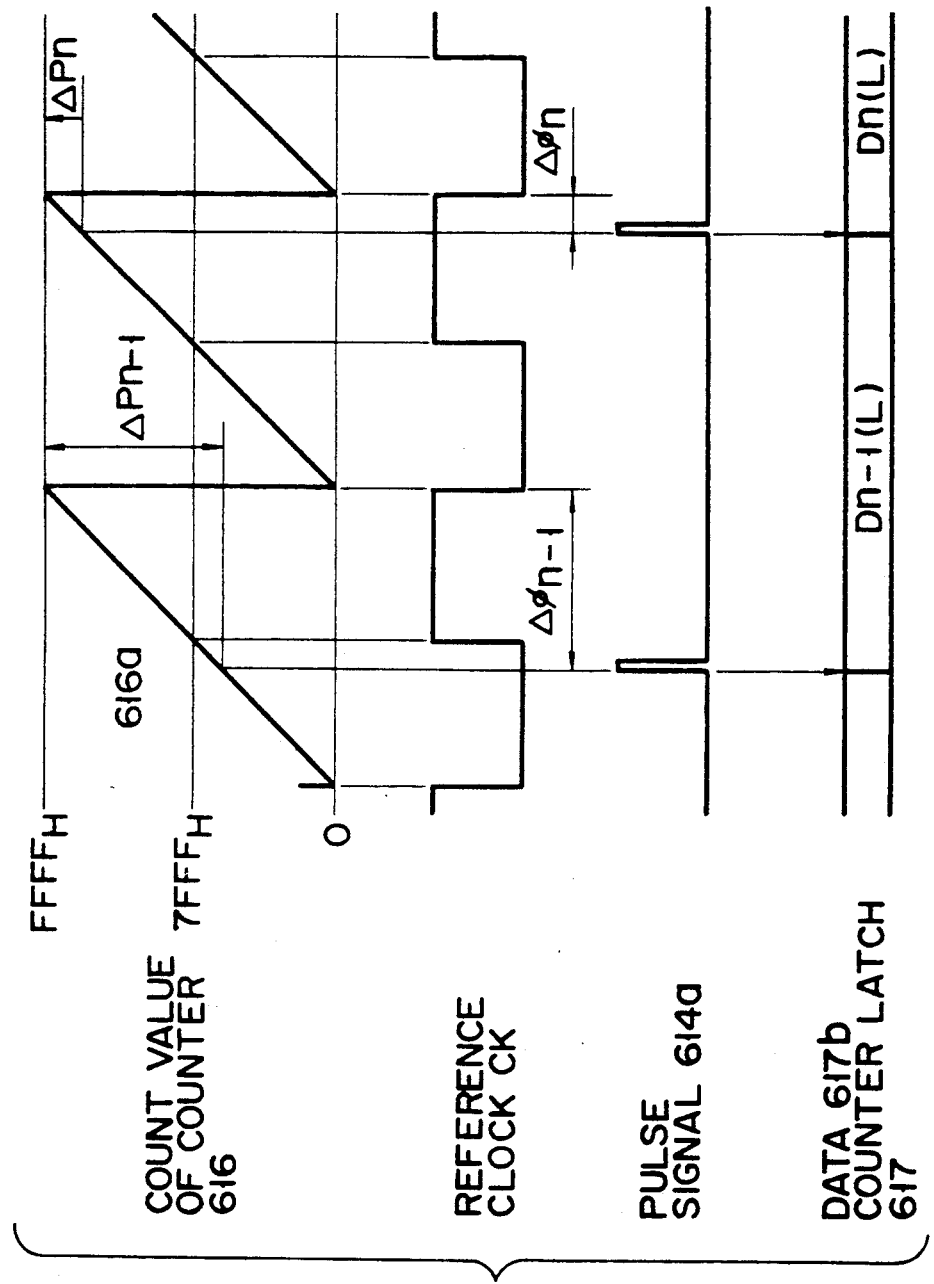

Accordingly, paying attention to the lower 16 bits of the counter 616, the standard clock CK can be assumptively set. Then, as shown in FIG. 10, by determining a difference $\Delta Pn$ between the maximum $FFFF_H$ of the lower 16 bits of the counter 616 and the data 617b of the lower 16 bits of the counter latch 617 latched by the pulse signal 614a, the phase difference $\phi n$ between the standard clock CK and the pulse signal 614a can be found.

With reference to FIG. 11, the control volume for the main motor 307 for the cycle difference (frequency difference) and the phase difference determined by the above-described method will be explained. FIG. 11 shows a frequency control volume $V_F$ for a cycle $\Delta Fn$, where $-\Delta f$ to $\Delta f$ represents an allowable cycle difference scope (lock scope), and the digital quantity for the cycle difference $\Delta Fn$ determined by substracting the cycle Dn from the standard cycle $10000_H$ is given in 8 bits (0 to $FF_H$). For example, when $\Delta f = m \cdot FF_H$ in the condition that the cycle AFn is within the scope of $-\Delta f$ to 0, the frequency control volume VF is given in the following equation:

$$V_F = 7F_H - \Delta Fn/2 \cdot m$$

On the other hand, in the condition that the cycle $\Delta Fn$ is within the scope of 0 to $\Delta f$, the frequency control volume $V_F$ is given in $V_F = 7F_H + \Delta Fn/2 \cdot m$. Where the cycle AFn is out of the lock scope of $-\Delta f$ to $\Delta f$, the frequency control volume $V_F$ is fixed to 0 for $\Delta Fn \leq -\Delta f$, and the maximum value $FF_H$ for $\Delta Fn \geq \Delta f$.

FIG. 12 shows a frequency control volume $V_P$ for the data Dn (L) of the lower 16 bits of the data Dn, where the frequency control volume $V_P$ for the 0 to $FFFF_H$ of the data Dn (L) is given in 8 bits (0 to $FF_H$) as a digital quantity. By multiplying the frequency control volume $V_F$ by a gain ratio $G_F$, by multiplying the frequency control volume $V_P$ by a gain ratio $G_F$, and by adding the respective multiplied results to each other, the control volume of $V_F \cdot G_F + V_P \cdot G_P$ is determined and outputted to the data latch 624. Then a voltage output proportional to the control volume synchronizes with the pulse signal 623a, is latched in the D/A converter 618, and is supplied as the power supply signal S27 to the drive circuit 306.

Figure 13:
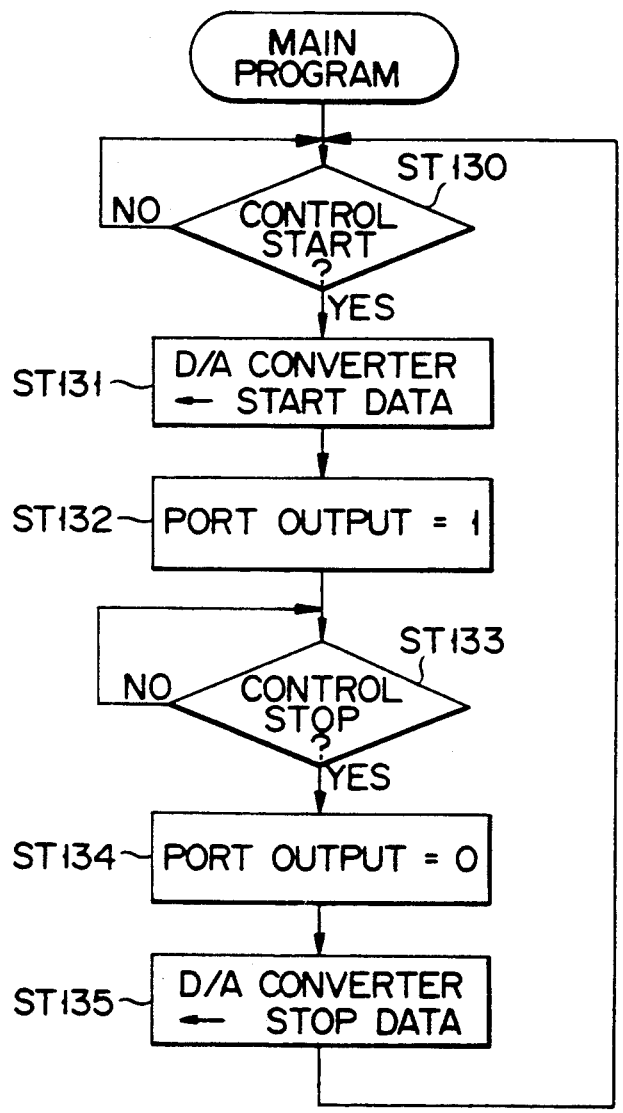
FIG. 13 is a flowchart for explaining the main program processing in a CPU.

FIG. 13 is a flowchart showing an example of the main program in the CPU 350. Where the interruption control signal 620a is 0, and the main motor 307 has stopped, whether the control is started or not is first checked (step ST130). The judgment of the start of control can be performed, for example, by checking whether a motor starting signal or command from an external source has been inputted or not. When such signal or command is inputted, starting data for starting the main motor 307 is outputted to the D/A converter 618 (step ST131), and at the same time, the main motor 307 begins to start gradually from its stop condition. Then, data is outputted to the port 620, to cause the interruption control signal 620a to be made "1" (step ST132), and the interruption request signal S31 is generated while synchronizing with the increase of revolution speed of the main motor 307 and gradually increasing its own frequency. Accordingly, after the step ST132 has been processed, an interruption processing program (described later) is performed in synchronism with the generation of the interruption request signal S31. Then, whether the control is stopped or not is checked (step ST133). The judgment of the stop of control can be performed, for example, by checking whether a motor stopping signal or command from external source has been inputted or not. When the control is not stopped, it enters the waiting state in the step ST133, and the main motor 307 is controlled in a manner to rotate stably by the interruption processing program. On the other hand, when the control is stopped, data is outputted to the port 620 to cause the interruption control signal 620a to be made 0 (step ST134), and the interruption request signal S31 becomes 0. Accordingly, after the step ST134 is performed, the interruption processing program is not performed, then, the stopping data for stopping the main motor 307 is outputted to the D/A converter 618 (step ST135), and said drive circuit 306, becomes off to cause the main motor 307 to decrease gradually its revolutions and finally stop. Then, the program returns again back to the step ST130 to repeat the same process. As previously described, the interruption request signal S31 is generated only when rotation control is performed.

Figure 14A:
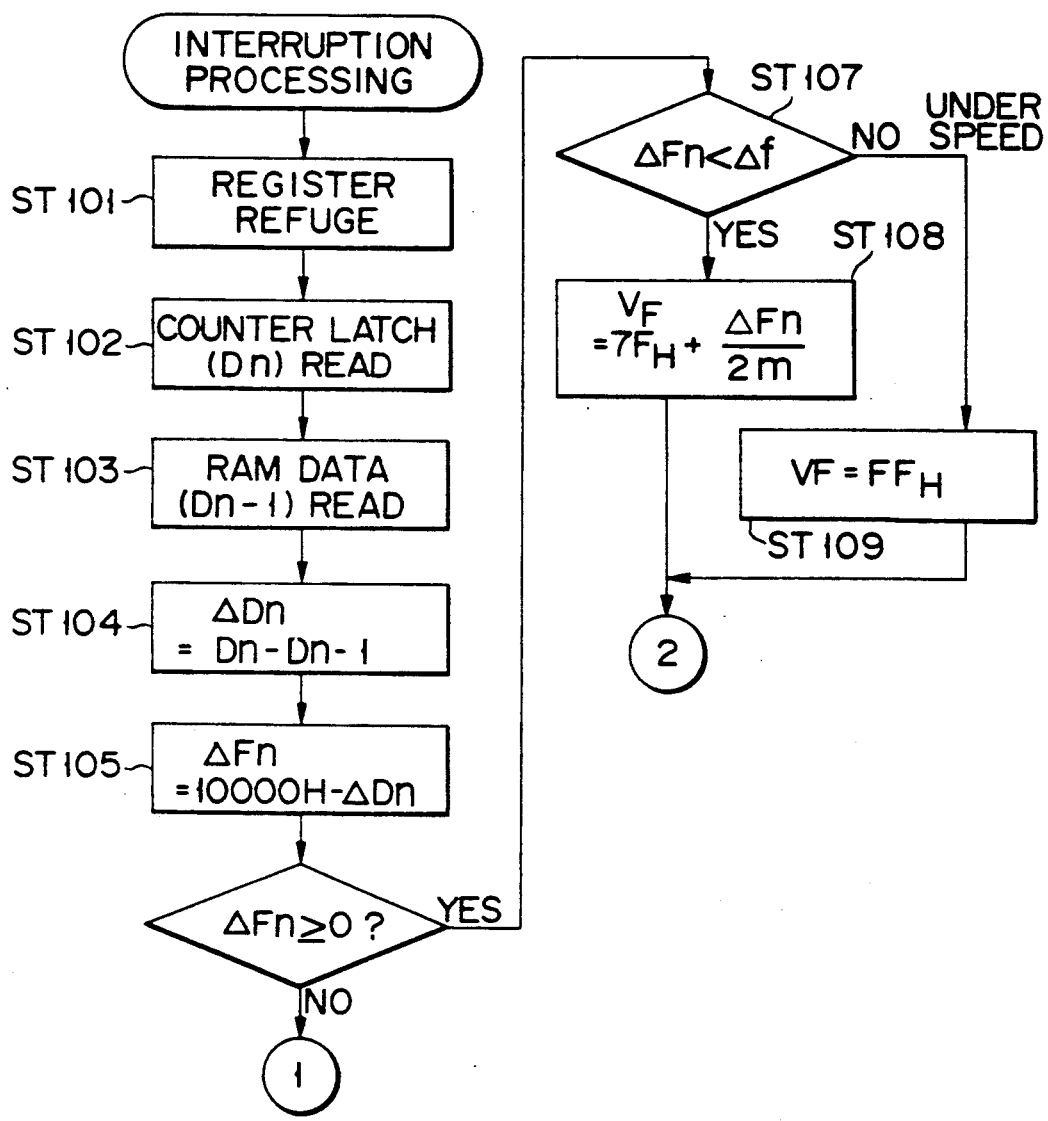
FIGS. 14A, 14B and 14C are flowcharts for explaining interruption processing.
Figure 14B:
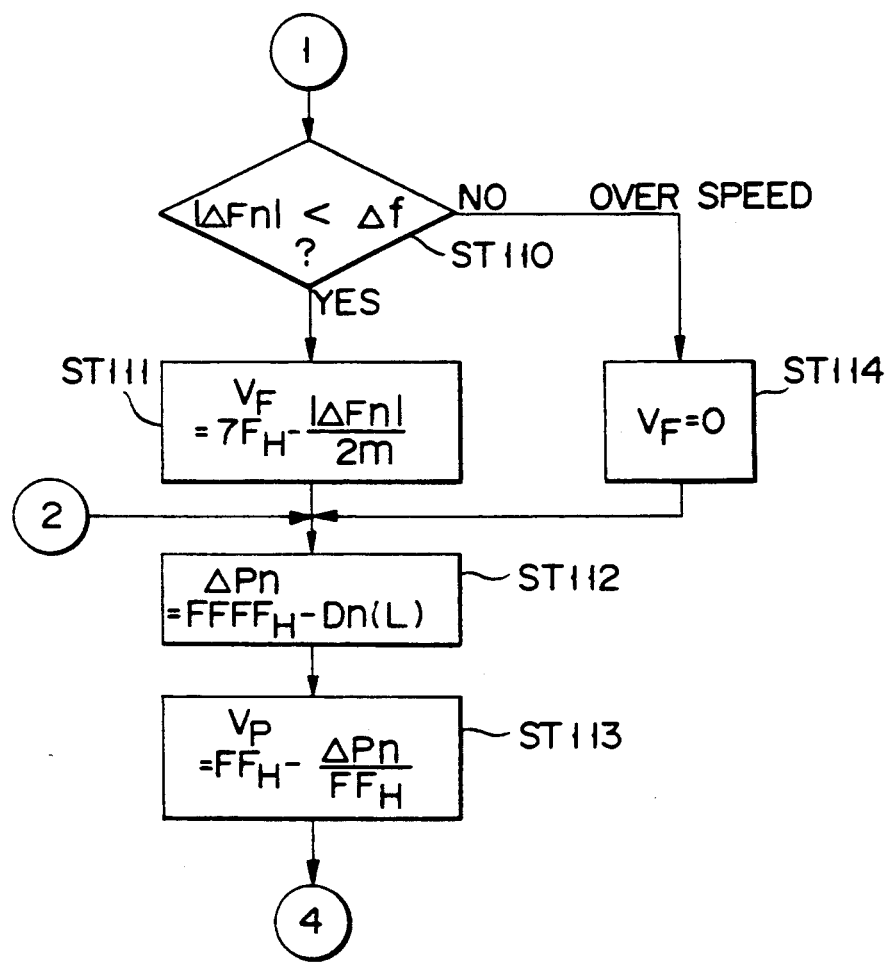
Figure 14C:
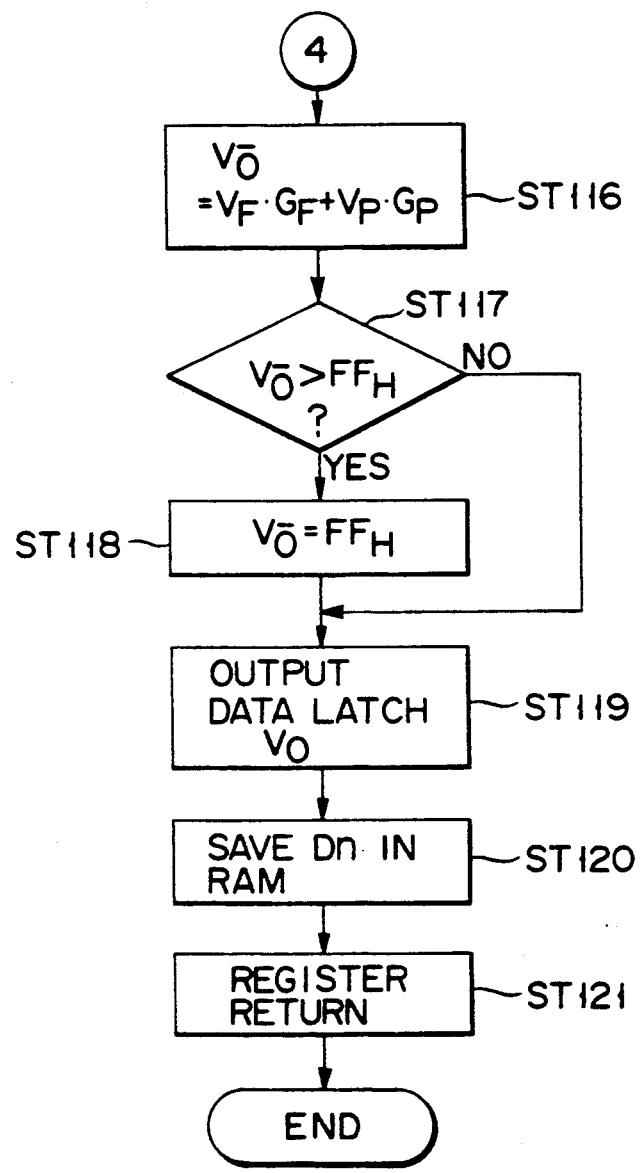

Referring to the flowcharts in FIGS. 14A, 14B and 14C, on the basis of the setting as described above, the interruption processing program is branched from the main program (not shown) and performed each time the pulse signal 614a is generated. First, the contents of a general purpose register in the CPU 350 is allowed to be saved in the RAM 43 (step ST101), the data Dn latched in the counter latch 617 is to be read (step ST102), and then the data which has been stored in the RAM 43 and read by the previous interruption processing is to be read as the $D_{n-1}$ (step ST103).

Then, by determining an absolute value of the difference between the data Dn and $D_{n-1}$, the cycle of the pulse signal 614a is calculated as ΔDn (step ST104). Further, by determining as the cycle difference the value ΔFn which is obtained by subtracting the cycle and 10 from the $10000_H$ corresponding to the standard cycle of the pulse signal 614a (step ST105), whether the cycle difference ΔFn is 0 or more, or not can be checked (step ST106). When the cycle difference ΔFn is 0 or more, the program is branched into the step ST107, where whether the cycle difference Δf is smaller than an allowable cycle difference Δf or not, that is, it is within the scope of 0 to Δf of the lock scope or not is checked. When the cycle difference ΔFn is within the scope of 0 to Δf, the frequency control volume $V_F$ is given in $V_F = 7_{FH} + \Delta Fn/2 \cdot m$ (step ST108). On the other hand, when the cycle difference ΔFn is the allowable cycle difference Δf or more, that is, under speed, the frequency control volume $V_F$ is set to the maximum value $FF_H$.

In the step ST106, when the cycle difference ΔFn is smaller than 0, the program is branched into the step ST110, where whether an absolute value |ΔFn| of the cycle difference ΔFn is smaller than the allowable frequency difference Δf or not, that is, the cycle difference ΔFn is within the scope of −Δf to 0 or not is checked. Then, when |ΔFn| is smaller than the allowable cycle difference Δf (−Δf<ΔFn<0), the frequency control volume $V_F$ is given by $V_F = 7F_{H-} |\Delta Fn|/2 \cdot m$. On the other hand, when |ΔFn| is the allowable cycle difference Δf or more (ΔFn< −Δf), that is, over speed, the frequency control volume $V_F$ is set to 0. Then, the program proceeds the step ST112, where the phase difference ΔPn given in $FFFF_H - Dn$ (L) is calculated. Then, in the step ST113, to make the relationship between the phase control volume VP and the data Dn (L) a condition shown in FIG. 15, $V_P = FF_H - \Delta Pn/FF_H$ is calculated. Thus, the frequency control volume $V_F$ and the phase control volume $V_F$ are determined, and by multiplying the frequency control volume $V_F$ by the gain ratio $G_F$, multiplying the phase control volume $V_P$ by the gain ratio $G_P$, and adding the multiplied results to each other, a control volume $V_O$ is calculated (step ST116). Then, whether the control volume $V_O$ exceeds the maximum value $FF_H$ or not is checked (step ST117), and when $V_O > FF_H$, the control volume $V_O$ is fixed to the maximum value $FF_H$ (step ST118) and outputted to the D/A converter 618 (step ST119).

Then, the data Dn is stored in the RAM 43 for the next interruption processing (step ST120), and the contents of the register saved in the RAM 43 in the step ST101 is returned again back to the register (step ST121) to terminate the interruption processing. After the interruption processing has been terminated, the program returns to the main program.

The maximum processing time required for said interruption processing program can be previously calculated from the maximum instruction time during which the CPU 350 performs the instructions of steps ST101 through ST121, so that, by setting a value larger than the maximum interruption processing time as a timer value of the timer 622, regardless of the variation in the interruption processing time repeatedly performed, the power supply data outputted to the data latch 624 in the step ST119 is latched in the D/A converter 618 by the pulse signal 624a after a certain time has always lapsed since the interruption processing started, and is outputted.

Although the program has been designed in the above embodiment assuming that the frequency control volume $V_F$ and the phase control volume $V_P$ are given linearly, such volumes can be used by setting to an arbitrary value by a data table according to the characteristic of control system. Also, the maximum value of the frequency control volume $V_F$ and the phase control volume $V_P$ can be set according to the variable scope of the drive circuit 306.

The above explanation has been made for a software servo control which controls the revolution speed of the main motor 307 in a manner that synchronizes with the standard frequency. On the other hand, the explanation for a software servo control of the mirror motor 106 will be omitted because it is the same as that of the main motor 307. However, in the motor control circuit 60 of the main motor 307, the oscillation frequency of the oscillation circuit 615 has been set to 55.050240 MHz, so that the standard cycle, that is, the cycle of the FG pulse S28 when the main motor 307 is rotating at the target revolution speed becomes $(65536/55.050240 \times 10^6) = 1,190 \times 10^{-3}$ (sec). On the other hand, in the motor control circuit 361 of the mirror motor 106, the oscillation frequency of the oscillation circuit 615 has been set to 8.84736 MHz, so that the standard cycle, that is, the cycle of the FG pulse S30 when the main motor 307 is rotating at the target revolution speed becomes $(65536/8.84736 \times 10^6) = 7,7407 \times 10^{-3}$ (sec).

Figure 15:
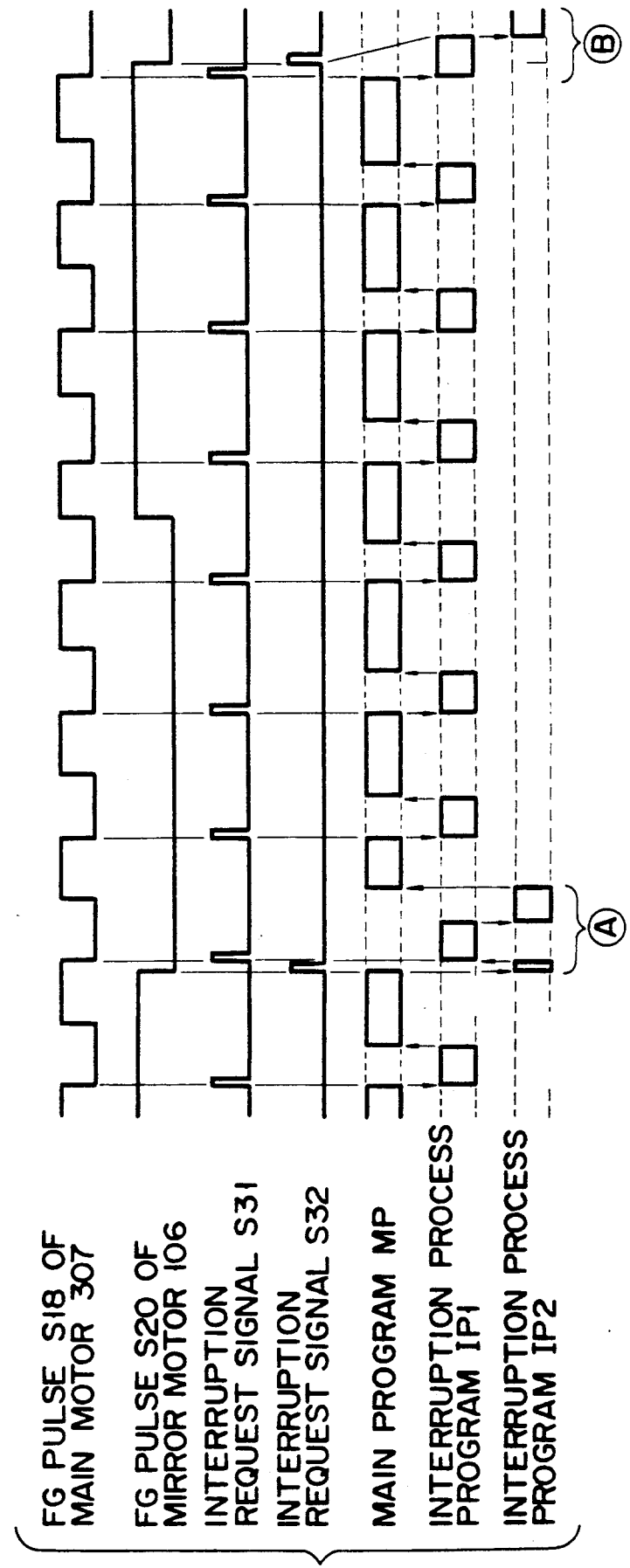
FIG. 15 is a timing chart for explaining multi-interruption processing.

As shown in FIG. 15, in a software servo system O which controls the main motor with a closed loop of the main motor 307 the motor control circuit 360→the CPU 350→the motor control circuit 360→the main motor 307 by the above method, and a software servo system N which controls the mirror motor with a closed loop of the mirror motor 106→the motor control circuit 361 the CPU 350→the motor control circuit 361→the mirror motor 106 by the above method, the interruption processing program IPl in the servo system O is branched from the main program MP in response to the interruption request signal S31 generated by the FG pulse S28, and executed. Also, the interruption processing program IP2 in the servo system N is branched from the main program MP in response to the interruption request signal S32 generated by the FG pulse S30, and executed. At that time, if another interruption request signal S31 is generated during the execution of the interruption processing program IP2 by the generation of the interruption request signal S32, the interruption processing program IP2 will be interrupted, as shown by A) in FIG. 15, whereby the interruption processing program IPl to the interruption request signal S31 will be given priority and executed. After the interruption processing program IPl has been executed, the interruption processing program IP2 having been interrupted is executed and finished, and then the processing is returned to the main program MP. Also, even if the interruption request signal S32 is generated during the execution of the interruption processing program IPl, as shown by B) in FIG. 15, the interruption processing program IP2 to the interruption request signal S32 will not be executed before the execution of the interruption processing program IPl is finished. That is, the software processing in the servo system "O" is executed in a manner to be given priority to the software processing in the servo system N.

Accordingly, in the interruption processing program IP2, a frequency signal to enable the execution of the interruption processing program IPl is performed. Usually, for such purpose, an Enable Interruption (EI) instruction will be executed, or means not to disable (non-maskable) the interruption processing program IPI may be used. On the other hand, in the interruption processing program IPI, other interruption will not be enabled.

As described above, the servo system O whose standard frequency is higher than that of the other system is processed in a manner to be given priority to the other system, so that the control delay time due to difference in time between the generation of the FG pulse S28 and the output of the power supply control signal S28 to the main motor 307 is only the time required for the interruption processing program IPl, whereby the delay time can be quantified. Accordingly, by setting the gain ratios $G_F$ and $G_P$ to a proper value while considering the control delay time, a stable servo control with a good response characteristic can be performed. On the other hand, in the servo system N, although the maximum delay time is the sum of the interruption time of the servo system 0, that is, the execution time of the interruption processing program IPl and the execution time of its own interruption processing program IP2, the interruption time of the servo system "O" can be substantially neglected because it is short enough compared with the standard frequency, thereby allowing the control delay to be quantified as with the servo system "O".

As described above, where, when an FG pulse being another interruption request during the processing of an interruption, the standard frequency of the FG pulse generated later is higher than that of the FG pulse being the interruption request of the interruption processing executed currently, the interruption processing to the interruption request generated later will be executed in a manner to be given priority to the interruption processing executed currently. That is, the higher the standard frequency of a servo control system is in order to control stably the revolution frequency of motors by use of the standard frequency, in short, the closer the revolution frequency is to the standard frequency, and the higher the standard frequency is, the shorter the sampling cycle becomes, so that interruption processing can be performed in a manner to be given priority and the proportion of the control delay time to the sampling cycle be made small, to improve response characteristic.

Thus, the servo system with a higher standard frequency is controlled in a manner to be given priority to the servo system with a lower standard frequency, whereby the control delay time can be minimized, and a stable software servo control of motors be performed with a good response characteristic.

The main motor for rotating the photosensitive drum and the like and the mirror motor for rotating the polygon mirror are controlled in such a manner that a frequency signal according to the revolution speed of each motor is detected, a frequency difference and a phase difference between the revolution frequency and standard frequency of said each motor are calculated by the frequency signal thus detected, and the power supply to said each motor is controlled according to the frequency difference and the phase difference thus calculated, whereby the configuration of circuits for controlling each motor can be made simple and the hardware for motor control be made common even to use in a different control system.

The interruption processing is controlled in such a manner that, only when the revolution control of motors is performed, an interruption request signal is generated in response to an FG pulse so as to allow interruption processing, while, even if an FG pulse is generated for a time from the steady revolution to the stop of motors, or because of vibration during stoppage or the like, the output of an interruption request signal in response to the generation is disabled, so as not to allow the interruption processing whereby a malfunction can be prevented, a stable control be performed, and reliability be improved.

Also, the power supply is controlled in such a manner that the timer is allowed to operate for a specified time in synchronism with an FG pulse, and upon the completion of operation, the power supply data of the data latch is outputted to the D/A converter, that is, the power supply is changed for a certain time in synchronism with an FG pulse, whereby the power supply data can be outputted after a specified time has lapsed, regardless of the variation in interruption processing time, and stable software servo control is performed.

Figure 16:
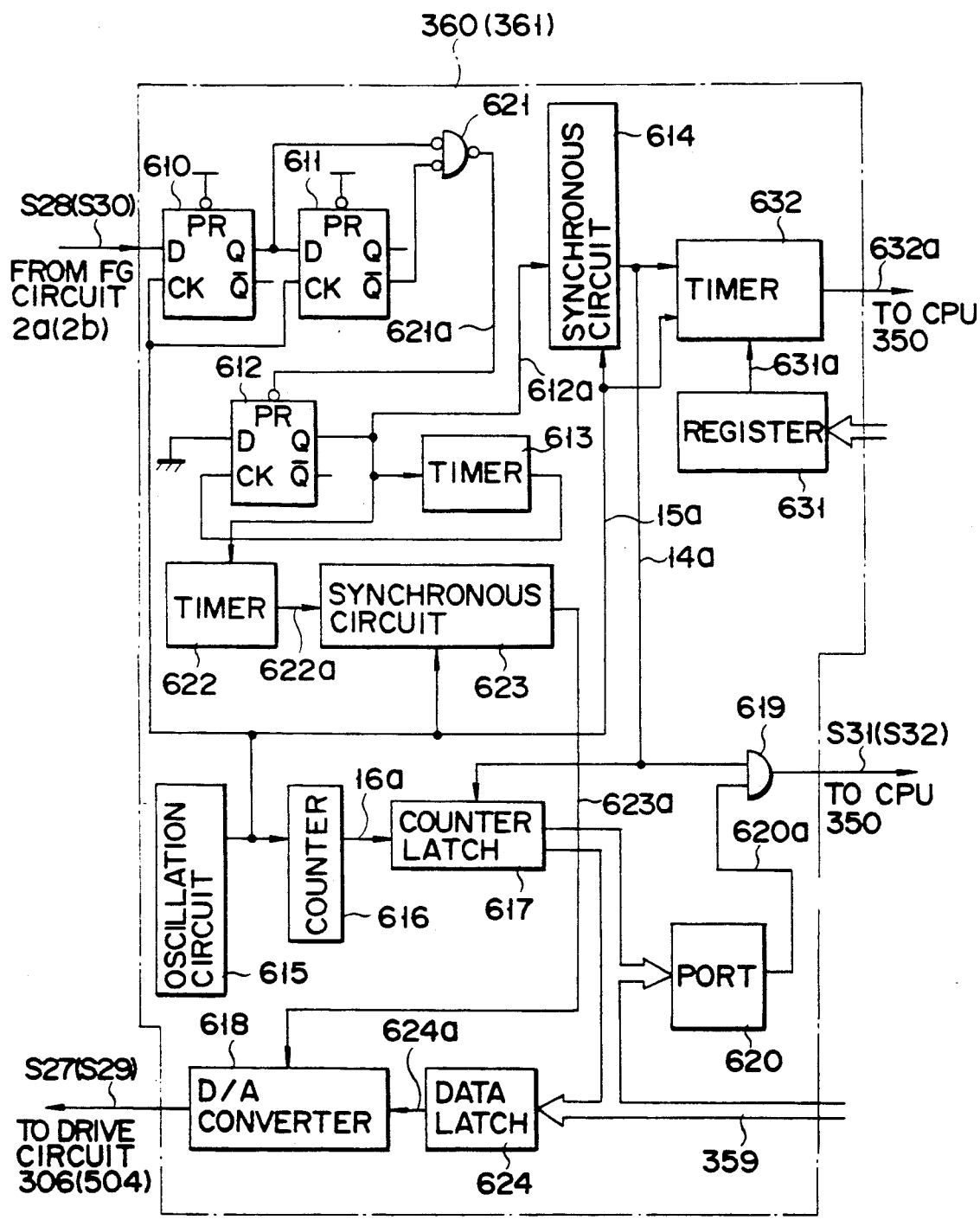
FIG. 16 is a block diagram of another configuration of a motor control circuit.

FIG. 16 is a block diagram showing the configuration of another motor control circuit 360 (361) in FIG. 2. In this embodiment, a motor may be controlled in such a manner that an FG signal in response to the revolution speed of the motor has not been generated within a specified time is detected. In response to the detection, the motor is stored. As shown in FIG. 16, such control can be performed by adding a register 631 and a timer 632 to the motor control circuit shown in FIG. 5. The data for controlling the operation of the timer 632 is supplied from the CPU 350 to the register 631, which, in turn, outputs a trigger signal 631a to the timer 632. The trigger signal 615a from the oscillation circuit 615 and the pulse signal 614a from the synchronous circuit 614 are supplied to the timer 632, which, in turn, outputs a signal to the CPU 350. Thus, the timer 632 starts on operation by the rise of the trigger signal 631a, and is initialized each time the pulse signal 614a goes to high level. When the main motor 307 is normally rotating, the pulse signal 614a generates a pulse at a certain cycle matched to the revolution speed, whereby the timer 32 repeats initialization and does not reach a specified time (Tel), and the timer signal remains at a high level.

Figure 17:
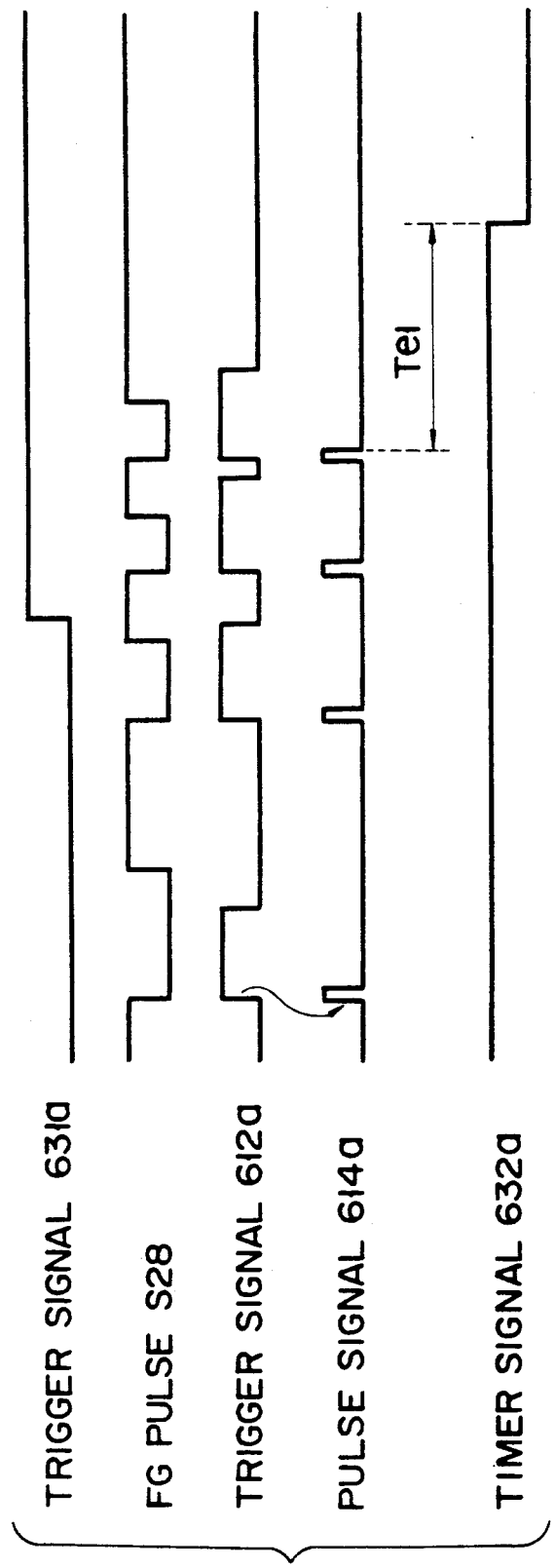
FIGS. 17 and 18 are timing charts for explaining error detection.
Figure 18:
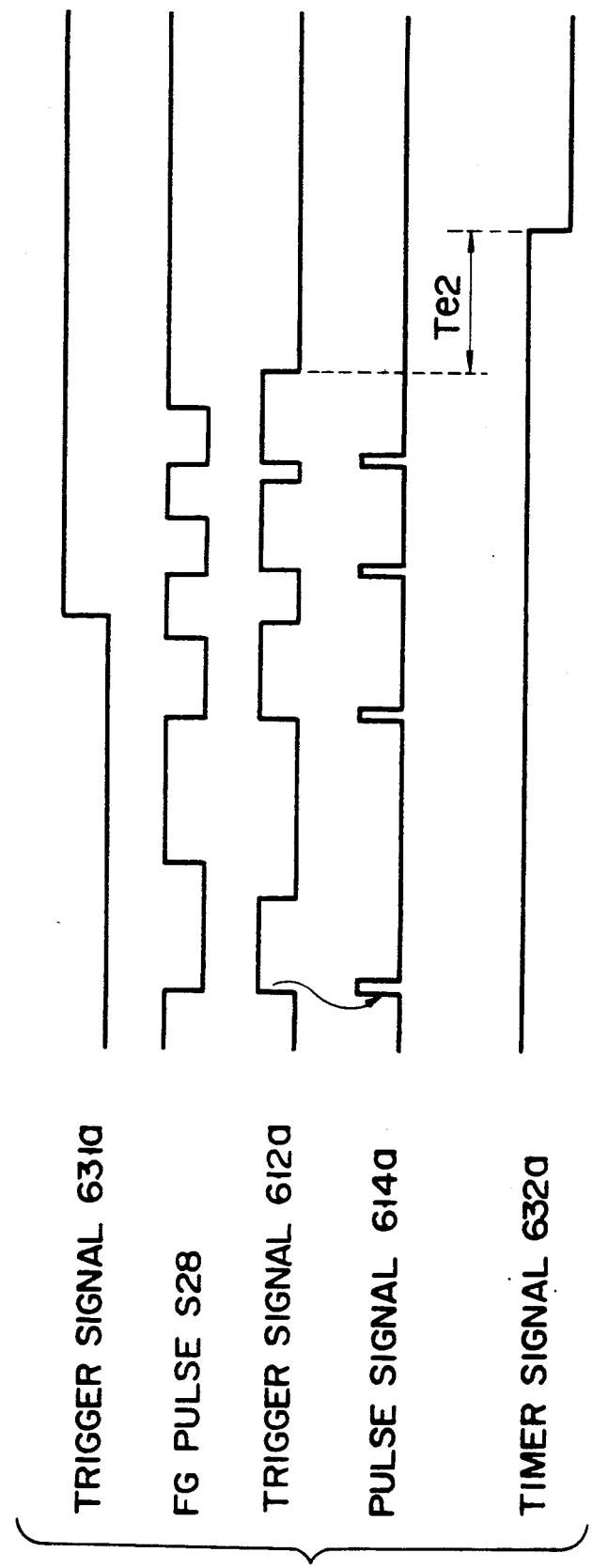

As shown in FIG. 17, if an FG signal 3a is not generated from the FG circuit 2a, the pulse signal 614a will go to low level, and the timer 632 output (0) the timer signal 632a after the specified time (Tel) has lapsed. At that time, the timer signal 632a acts as an interruption request of the CPU 350 to cause the main program to be branched into the interruption processing program at error detection during the execution of the main program by the CPU 350, so that an abnormality of the main motor 307 can be detected by the execution of the interruption processing program at error detection. The signal for initializing the timer 632 may also employ the trigger signal 612a in place of the pulse signal 614a. The time chart of each signal at that time is shown in FIG. 18. When the motor is normally rotating, the pulse signal 612a is outputted at certain rate matched to the revolution speed, whereby the timer 632 repeats initialization. At that time, if the FG signal 3a is not generated from the FG circuit 2a, the trigger signal 612a will go to low level, and the timer 632 output (0) the timer signal 632a after a specified time (Te2) has lapsed. At that time, the timer signal 632a acts as an interruption request of the CPU 350 to detect an abnormality of the main motor 307.

FIG. 19 shows a flowchart of the interruption processing program at error detection. If the pulse signal 614a is not generated within a specified time, the interruption processing program at error detection will be branched from the main program or from the interruption processing program, and executed. That is, the interruption processing program at error detection is performed in such a manner that the contents of a general purpose register in the CPU 350 is allowed to be saved in the RAM 43 (step ST131), stopping data is to be outputted to the D/A converter 618 to stop the main motor (step ST132), a motor operation flag is made off (step ST133), a motor error flag meaning that the main motor is in error condition is made on (step ST134), and the contents of the register having been saved in the RAM 43 in the step STIOI is returned again to the register (step ST135) to terminate the interruption processing. Thus, in a controller for controlling the revolution speed of motors by a software, an abnormality of motors can be detected, and a safer and stable control be performed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image forming apparatus comprising:
   means for forming an image on an image bearing member;
   a plurality of means for driving the image forming means, the plurality of driving means being driven and controlled by predetermined frequency signals respectively;
   means for detecting the predetermined frequency signals;
   means for calculating a frequency difference and a phase difference between a revolution frequency and a standard frequency by use of the frequency signal from the detecting means; and
   means for causing the calculating means to execute preferentially a calculation process for the driving means driven by a higher frequency signal, instead of a calculation process for the driving means driven by a frequency signal calculated by the calculating means when, during the calculation process of the calculating means, the higher frequency signal is detected by the detecting means.

2. An image forming apparatus according to claim 1, wherein the detecting means has a first and second frequency generating circuit for generating FG pulse signals.

3. An image forming apparatus according to claim 1, wherein the calculating means has a first and second motor control circuit.

4. An image forming apparatus comprising:
   an image bearing member;
   means for forming a latent image on the image bearing member, the forming means having a polygon mirror means for exposing a light on the image bearing means;
   first motor means for driving the polygon mirror means, the first motor means for being driven and controlled by a first frequency signal;
   second motor means for driving the image bearing member, the second motor means being driven and controlled by a second frequency signal higher than the first frequency signal;
   means for detecting frequency signals to drive the first and second motor means;
   means for calculating a frequency difference and a phase difference between a revolution frequency and a standard frequency by use of the frequency signal from the detecting means; and
   means for causing the calculating means to execute preferentially a calculation process for the second motor means instead of a calculation process for the first motor means, when, during a calculation process of the calculating means for the first motor means, a frequency signal of the second motor means is detected by the detecting means.

5. An image forming apparatus according to claim 4, wherein the detecting means comprises a first and second frequency generating circuit for generating FG pulse signals.

6. An image forming apparatus according to claim 4, wherein the calculating means comprises a first and second motor control circuit.

7. An image forming apparatus comprising:
means for forming an image on an image bearing member;
a plurality of means for driving the image forming means, the plurality of driving means being driven and controlled by predetermined frequency signals respectively;
first timer means for serving to start an operation on the basis of a revolution frequency signal of the driving means and to operate during a period shorter than a period of a revolution frequency signal obtained when the driving means are rotated at a predetermined revolution frequency while inhibiting receipt of another revolution frequency signal during the period;
second timer means for serving to start an operation on the basis of a revolution frequency signal of the driving means, and to operate during a period which is shorter than a period of revolution frequency signal obtained when the driving means are rotated at a predetermined revolution frequency and which is longer than a process time of interruption processing program executed by an interruption request signal generated by the revolution frequency signal, and to output an amount of power-supply control calculated by the interruption processing program to power-supply control means; and
third timer means initialized in synchronism with the revolution frequency signals of the motor, for serving to detect an abnormality of the motor when it is not initialized by the revolution frequency signal for a longer time period than a normal time period of the revolution frequency signal of the motor.

* * * * *